(12) United States Patent
Barrett et al.

(10) Patent No.: US 7,587,713 B1
(45) Date of Patent: Sep. 8, 2009

(54) SYSTEM AND METHOD FOR CONTROLLING INSTALLATION OF ONE OR MORE COMPONENTS FOR A DATA STORAGE MANAGEMENT SYSTEM

(75) Inventors: Christopher M. Barrett, Medway, MA (US); Victoria Nordenberg, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 595 days.

(21) Appl. No.: 10/335,349

(22) Filed: Dec. 31, 2002

(51) Int. Cl.
*G06F 9/44* (2006.01)

(52) U.S. Cl. ..................................... 717/168

(58) Field of Classification Search ......... 717/168–172, 717/174–178
See application file for complete search history.

(56) References Cited

U.S. PATENT DOCUMENTS

| 6,282,712 | B1 * | 8/2001 | Davis et al. .................. 717/170 |
| 6,687,902 | B1 * | 2/2004 | Curtis et al. ................. 717/175 |
| 2003/0200149 | A1 * | 10/2003 | Gonzalez et al. ............. 705/26 |

* cited by examiner

*Primary Examiner*—Wei Y Zhen
*Assistant Examiner*—Philip Wang
(74) *Attorney, Agent, or Firm*—Krishnendu Gupta; Joseph D'Angelo

(57) ABSTRACT

This invention is a system and method for local and/or remote installing, uninstalling, or upgrading components of a data storage management system, and may include an ability to control the installation from a central location in accordance with rules and protocol for order and number of components.

28 Claims, 17 Drawing Sheets

SYSTEM AND METHOD FOR CONTROLLING INSTALLATION OF ONE OR MORE COMPONENTS FOR A DATA STORAGE MANAGEMENT SYSTEM

This application is related to 2 co-pending U.S. Patent Applications, U.S. patent application Ser. No. 10/335,509 and U.S. patent application Ser. No. 10/335.650, each application by Christopher Barrett et al., both filed Dec. 31, 2002, and each is assigned to the same assignee as this invention. A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This application generally relates to a data storage management system, and more particularly to installation of such a system.

BACKGROUND

Computer systems may include different resources used by one or more host processors. Resources and host processors in a computer system may be interconnected by one or more communication connections. These resources may include, for example, data storage systems, such as the Symmetrix™ family of data storage systems manufactured by EMC Corporation. These data storage systems may be coupled to one data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests such as data read and write operations. Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units neither may or may nor correspond to the actual disk drives. Allowing multiple host systems to access the single storage device unit allows the host systems to share data stored therein.

It is desirable to manage and monitor data storage systems for a variety of different reasons, such as, for example, to obtain configuration data and/or performance data. Performance data may include, for example, data regarding system device usage and throughput, system load. System configuration information may be obtained in connection with a system configuration modification such as, for example, a logical or physical device reconfiguration. Monitoring and related operations for data storage system management may be automated. It may be desirable to have an automated monitoring system that efficiently provides updated configuration data and other information about a data storage system. However, such data storage management is complicated by the fact that modern data storage environments may include multiple and various data storage systems, host computers for communicating with them, and also multiple and various switches. Since there are many manufacturers and vendors of such systems and devices, there is no one protocol or architecture that dominates, and such a system is referred to as heterogeneous.

Installation of such a data storage management system is problematic because of the heterogeneous data storage environment and the size of such environments and geographic dispersion of such systems, which may even be distributed globally, with various systems in various parts of the world. What is needed is an effective, not complicated tool for installing components of a data storage management system for a heterogeneous data storage environment that may serve a global distribution of such an environment.

SUMMARY OF THE INVENTION

To overcome the problems of the prior art mentioned above and to provide advantages also described above, this invention is a system and method for affecting software components included with a data storage management system.

In one embodiment, the method includes affecting software components of a data storage management system including a server and a console having a display for managing of a data storage environment. This process includes selecting a software component at the console's display for installation on at least one designated host computer in the data storage environment, wherein the host computer may be located local to or remote from the console. In the case where it is remote, this process further includes a step responsive to the selection of a software component on at least one designated host computer wherein the server sends information to the remotely located host computer that includes information needed for installation of the software component. Responsive to the receipt of the information at the at least one designated host computer the software component is installed. In similar fashion following the installation the software component may be uninstalled or upgraded remotely from the console. In another embodiment, a system and/or program product is provided that is configured for performing the steps of the method of affecting components just described above. Also in another embodiment an apparatus is provided configured for carrying out such steps.

In another embodiment, the method includes installing software components of a data storage management system, comprising the following steps of installing a database, which may be denoted as a repository as a first software component of the data storage management system. The so-called repository includes tabular data entries that are used to enforce rules and order of installation of further software components of the data storage management. In that other embodiment, a system and/or program product is provided that is configured for performing the steps just described. Also in that other embodiment an apparatus is provided configured for carrying out such steps.

In one other embodiment, a method includes the following steps of selectively installing components of the data storage management system locally on computers included as part of the data storage management system or remotely from the console. In that one other embodiment, a system and/or program product is provided that is configured for performing the steps just described. Also in the one other embodiment an apparatus is provided configured for carrying out such steps.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENTS

Figure 1:
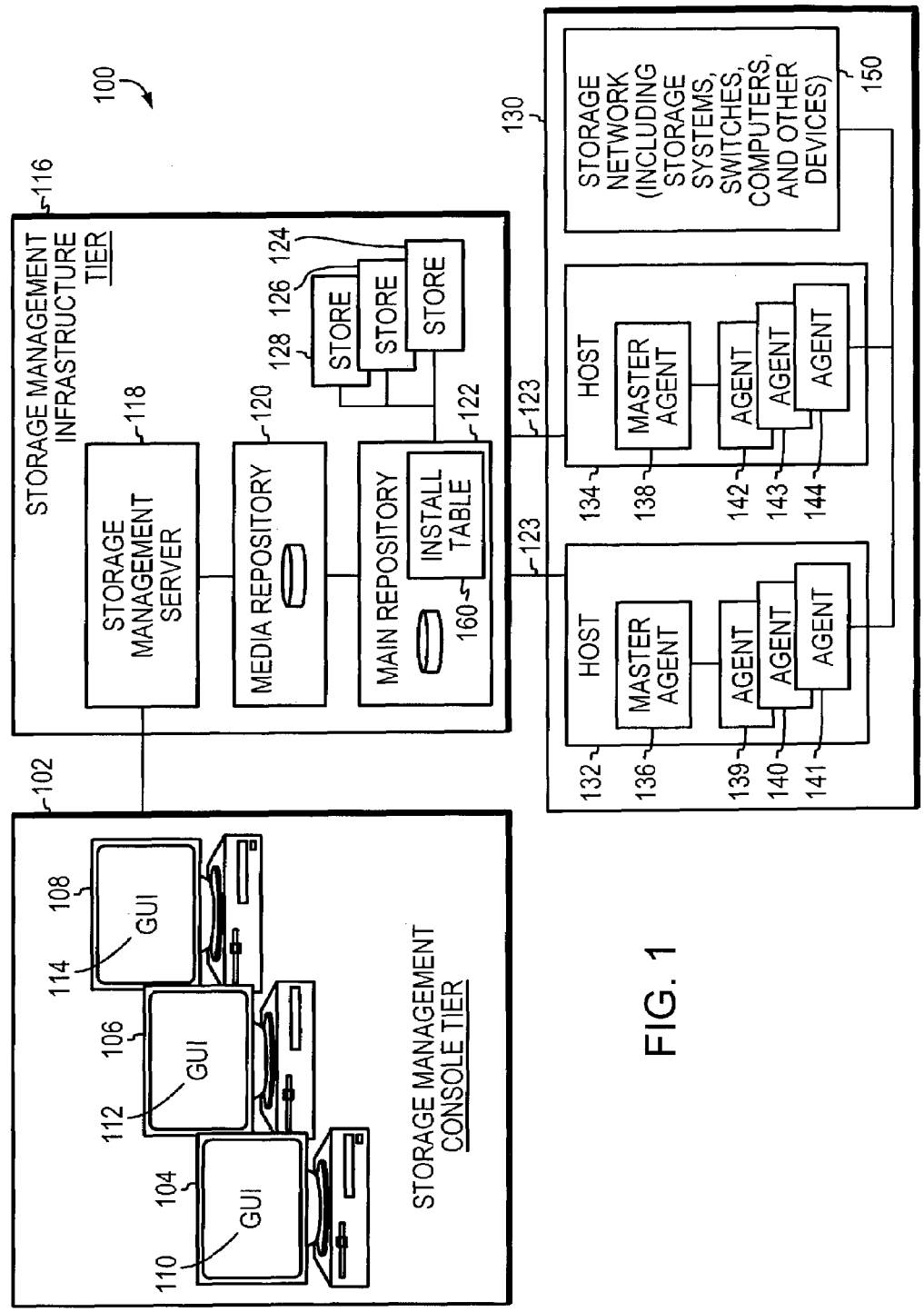
FIG. 1 shows a block diagram schematic of an embodiment of a data storage management system of this invention having a preferred architecture including a storage management console tier, a storage management infrastructure tier and a host tier including a storage network that may be managed by the storage management system.

This invention is directed toward installing one or more components of a Data Storage Management System for managing a distributed data storage environment including heterogeneous components.

Overview of Preferred Embodiments of this Invention

In one embodiment one or more components of a Data Storage Management System may be installed remotely on processing systems that communicate with a server and console that are each part of the data storage management system. Such remote installation may use one or more networks and including the internet for a so-called distribution or "pushing" of components, e.g. as software agents, that may be related to software products, or applications, from one location (e.g. at a data storage management console or a server) to another location, e.g. on processing systems that may be functioning as host computers. The invention, in one embodiment, allows for distribution of software components, e.g. agent applications to one or more remote hosts, controlled by one or more Console applications (described with reference to FIG. 1 below). The distribution method also allows for remote upgrades or uninstalls of the agents to be done from the Console as well. A log of the install/upgrade/uninstall is sent back to the Console user for verification of task completion In another embodiment, one or more components may be installed locally on any part of the data storage management system, and logic or software components may function in a state machine capacity, enforcing rules, and controlling order.

And in still another embodiment, a data storage management system may be configured with both the capability to have local installation with the state machine function described above and also be configured for remote installation of components, and in particular, remote pushing of agents to host computers that communicate with other components, e.g. a server and console in the data storage management system.

In this embodiment, the invention allows for centralized control of software installations across a distributed system. A preferred installation software-based tool, e.g. an Installation Wizard that stores user provided input and host/product installation information into one or more tables of a Main Repository, which is preferably an Oracle database. Each time the Installation Wizard is launched, it connects to this Repository to access this shared information. This Repository hostname and listening port number are obtained from a host computer, using for example, the known Microsoft Windows Registry, if present. If not already in the Windows Registry, the user will be prompted to provide the connection information (and it will written to the Windows Registry for future use).

The installation information from the tables stored in the database are then used by the Installation Wizard to enforce state transitions, functioning as a state machine, and then acting functionally in conjunction with the Main Repository once that component is installed to control the installation. It also allows sharing user input, which is in addition to the state machine function, so in total it can:

1) enforce business rules such as limiting only a single server installation per distributed Data Storage Management System;

2) share user input across the distributed system so the user is not prompted for common information which had previously been entered during other product installations in the distributed system;

3) control product/component installation order (e.g. repository must be installed first, and then the server must be installed before certain other components); and 4), identify products/components (and their versions), which had previously been installed on a particular host.

In still another embodiment of this invention, a data storage management system may be installed on a component-basis using remote processes across a distributed system, including across the internet, while other components may be installed locally and with the control of a state machine as described with reference to one embodiment discussed above. The versatility and function provided in this embodiment for installation of a data storage management system for managing, including monitoring of a distributed (including global distribution) data storage environment is novel and advantageous over prior art solutions. Moreover, the other embodiments, are each novel and advantageous over prior art solutions as well. In particular, the deployment of software components, including applications agents from a central point, such as a management console allows the user to do so without physically locating the remote host. In a preferred embodiment, it is required that some software components be included first on the remote host before remote deployment, e.g. the Master Agent software, but one skilled in the art should recognize, in view of these teachings, how to remotely deploy components in ways not limited by the example, but only by the claims appended hereto. This approach to software deployment allows for simplified deployment in large environments, particularly those using globally distributed storage, because the internet may be used for the deployment.

Data Storage Management System to be Installed

In keeping with these concepts, reference is now made to FIG. 1, wherein FIG. 1 illustrates an example of a Data Storage Management System 100 including three architectural tiers for managing heterogeneous data storage systems (i.e., various architectures and vendor makes) that are part of storage network 150, which may also include switches, computers, and other devices. The Data Storage Management System of FIG. 1 comprises, a storage management console tier 102, a storage management infrastructure tier 116, and an agent tier 130 that allows communication with and management of host computers, e.g. hosts 132-134 and the storage network 150. The hosts may be located remote or local relative to the console. Regarding terminology, storage network is used broadly herein to refer to managed storage resources, such as storage arrays, also referred to as storage systems, network management components, e.g. switches, and any other storage-related entity that may interface with host computers and software running thereon and as described herein.

In a preferred embodiment, the data storage management system maybe entirely comprised by or include one or more components available from EMC Corporation of Hopkinton, Mass. as the EMC ControlCenter (ECC) Versions 5.0, 5.0.3, and 5.1. The ECC family of products available from EMC, and described herein enables management of storage networks and host computers in communication therewith by providing tools for discovery, monitoring, automating, provisioning, and reporting on host storage resources, networks, and general storage across an entire information environment such as that depicted in FIG. 1, and including the Data Storage Management system and all of the managed entities (including hosts and data storage systems). All of this management may from a single console, e.g. consoles 104, 106, and 108, each preferably equipped with a displayable graphical user interface (GUI) 110-114, each which is part of the architectural storage management console tier 102. The management may occur in a network configuration, including across the internet. The basic architecture of this invention is shown in FIG. 1 with additional detail described with reference to FIG. 2. However, a similar architecture from which the present architecture evolved is described in *Multiple Storage Array Control* to Murphy et al. filed Nov. 1, 1999 and assigned to EMC Corporation, the assignee of this invention, and which is hereby incorporated by reference.

From a single console, e.g. console 104, the preferred ECC product can be used to manage, including monitoring: storage components, included in the storage network, e.g. EMC's Symmetrix or Clariion Storage systems, or other vendor's storage arrays (e.g. Hitachi Data Systems (HDS), IBM, or Compaq/Hewlett Packard). Connectivity elements, such as fibre channel switches which a part of storage network 150 may also be managed, from discovery through consistent monitoring. Host components, such as hosts 132 and 134 which may include well-known operating systems (not shown), such as Microsoft Windows, Sun Solaris, HP-UX, and IBM AIX or MVS and their file systems, and resident volume managers, databases and backup applications (all of these not shown, but are well known in the art) may be communicated with through Master Agents 136-138 and Product/Application Agents 139-144 on respective hosts 132 and 134.

Referring again to FIG. 1, the preferred multi-tiered architecture includes a storage management infrastructure tier 116, which includes a Storage Management Server 118, which in a preferred environment is the ECCServer available from EMC (the terms are used interchangeably throughout for convenience and simplicity, but the ECCServer is merely a preferred example of a component useful with this invention). FIG. 1 illustrates the major components and the relationship to one another. The console tier 102 includes one or more console stations 104-108 and application software for managing the storage environment. The console is the user interface to the management functions and communicates with the preferred ECCServer. The infrastructure tier 116 includes a main repository 122, the storage management server 118, and one or more stores 124-128.

A Host agent tier 130 includes a host systems 132-134 and respective Master agents 136 and 138, which will described in more detail below, and also includes respective product or software application specific agents 139-144 per and is each is in communication with the customer storage environment or storage network 150 including storage systems, switches computers and other devices. As mentioned above the storage systems and the switches and the various hosts form a heterogeneous storage environment, since various vendors may provide them and follow different protocols and have different architectures. This heterogeneous environment may be managed by ECC once installed in accordance with the methods and systems described herein.

The storage management infrastructure tier 116 contains infrastructure components for the management of a heterogeneous storage environment, the preferred ECCServer, Main Repository, and one or more Stores, which are preferably embodied as software for communicating with the Main Repository, which is preferably a relational database, such as an Oracle Database, from Oracle Corporation of Redwood Shores, Calif. The preferred ECCServer 118 provides a common service that ties the infrastructure together. The ECCServer services any console's data requests. It controls access to management functions and governs which components may be accessed for such functions. It also keeps track of all managed objects and enables them to communicate with one another. The storage management server communicates with the consoles, Main Repository, and in some cases directly with the Master agents.

The Main Repository's database holds the current and historical data of both the storage environment and the storage management software itself. Most of this data is collected by the agents includes configuration details about storage arrays, hosts, and databases. It also includes statistical data for capacity planning, alerts, and detailed status information about any given device. The Storage Management Server and one or more Stores access the data stored in the Main Repository 122. Each Store is responsible for writing persistent data to the Main Repository that has been collected by the Agents.

Tier 130 contains the agents (Master and Product), one or more managed hosts and a managed storage network. The storage manager uses intelligent agents to manage, including monitoring of specific object domains, such as EMC Symmetrix storage arrays, Windows, UNIX, or MVS hosts. It also may manage switches. The agents monitor the health of the object, check for alert conditions, collect data about the object's configuration and performance, and they perform active commands. Hosts 132 or 134 can run several agents such as the Master agents and the product specific agents depending on number one time of objects is managing. For example, a Windows host might be running a storage agent for EMC Symmetrix, a host agent for the operating system Windows, a database agent for an Oracle database, and a connectivity agent for switches. The Master Agents, respectively, each run on each agent host to manage the individual product agents. Agents pass the data they collect to a Store, which writes such data to the Main Repository. Agents can also collect transient data such as alerts and real-time performance data, to pass a directly to the Storage Management Server.

General Installation of the Storage Management System

This invention provides systems and methods for installing a Storage Management System of the preferred architecture and including the preferred components and also including a Media repository 120 that is useful for installation and is a database coupled in communication with the server 118 (it may be integrally coupled with the server), and an install table 160 for managing installation.

Figure 2:
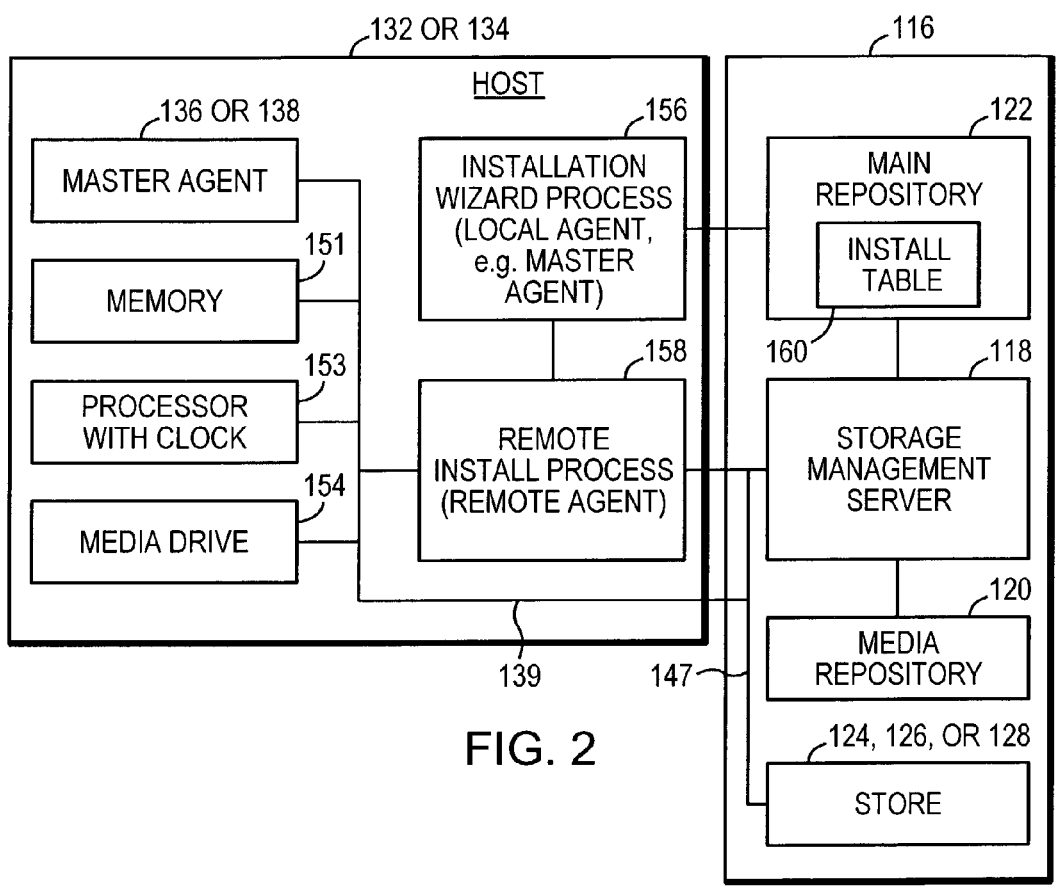
FIG. 2 shows a schematic block diagram overview of the functional relationship of a host for which agent software may be installed in relation to the infrastructure tier of FIG. 1, and showing an installation wizard process and remote install process which may be selectively configured for installation of agents on the host tier of the storage management system of FIG. 1.

Reference is now made to FIG. 2, either exemplary host computer system 132 or 134 includes an interconnection mechanism 139 coupling a memory 151, a processor with clock 153, media drive 154 capable of handling computer-readable media such as one or more CD-ROM's and one or more floppy diskettes (the exemplary ECCServer only supports CD-ROM's). The memory 151 in operation is encoded with logic instructions such as software application code and/or data configured in accordance with embodiments of the invention and which can cooperate with the processor 153 to access the logic instructions which may be accessed from media in the media drive to form an installation wizard process 156 for a local agent, e.g. a Master Agent, or for a remote installation process 158 for remote installation of remote agents. The Host is in communication with an interconnection mechanism 147 that may provide a wired or wireless connection or communication path to elements of the infrastructure tier for carrying out installation. For convenience, certain elements are shown in the infrastructure tier, which must of course first be installed and in accordance with methods of this invention, but once installed are used for further installation of components, all of which concepts are covered in detail below. The infrastructure components 122, 118, 120, and 124-128 have been described above and will be discussed in more detail below. The processor can access the logic instructions that form the process via the interconnection mechanism to the memory in order to perform (e.g., execute, run, interpret or otherwise operate) such logic instructions. When either Process is formed via the combination of the logic instructions with memory, an embodiment of this invention is present. When this happens, a process is formed via the combination of the logic instructions of the application operating on the processor. Accordingly, in one embodiment of the invention in a computer readable medium such as the memory 151, which includes logic instructions that when performed on the processor 153, provide an embodiment of the invention referred to herein as either a Local or Remote Process.

Figure 26:
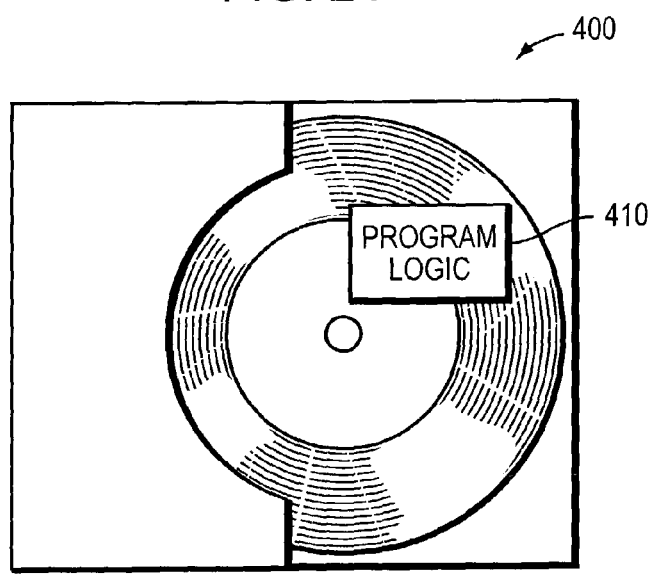
FIG. 26 is a computer program product including a computer-readable memory having program logic configured for enabling an embodiment of the method of this invention.

FIG. 26 shows a computer readable medium 400 including program logic 410 configured for carrying out one or more of the embodiments of the processes and method steps described herein, and may include all or part thereof of processes discussed below. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. And may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operate analogously to specific logic circuits.

Figure 3:
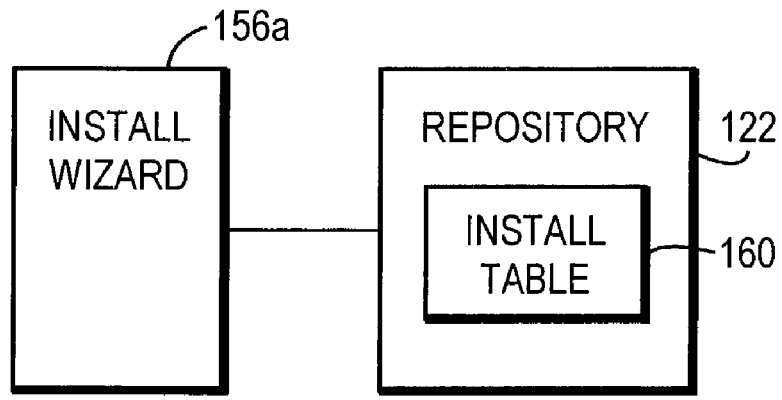
FIG. 3 shows a block diagram schematic of components for carrying out functions of a state machine that is useful for enforcing protocol including rules and order of installation of components of the storage management system of FIG. 1.
Figure 4:
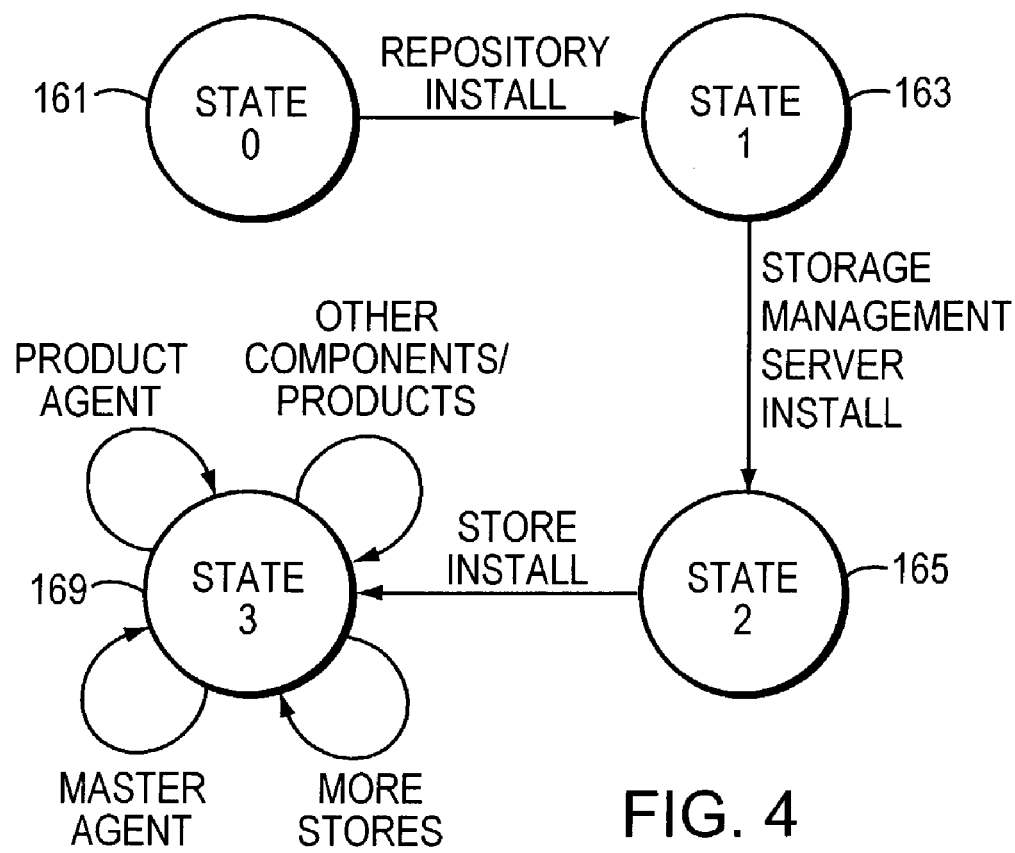
FIG. 4 is a state diagram schematic showing states of install enforceable by the state machine components of FIG. 3.

Referring to FIGS. 3 and 4, the combination of the Main Repository 122 with its Install Table 160 cooperates with the Install Wizard 156a to provide a state machine function for enforcing rules and order and as shown in overall fashion in the schematic state diagram of FIG. 4. State 0 (element 161) exists before the installation of any components. State 1 (element 163) exists following the install of the Repository. State 2 (element 165) exists following the install of Storage Management Server and State 3 (element 169) exists following the install of one Store. Optional and additional sub-states of State 3, include installation of more Stores, a Master Agent, and other Components or Products. Installation of Product Agents is shown in FIG. 4, but in the preferred embodiment, the state machine function does not control remote installs, which is how Product Agents are installed in that preferred embodiment. However, one skilled in the art will recognize in view of these teachings that other embodiments may include such and therefore this invention is not to be limited except by the claims and their equivalents.

Figure 5:
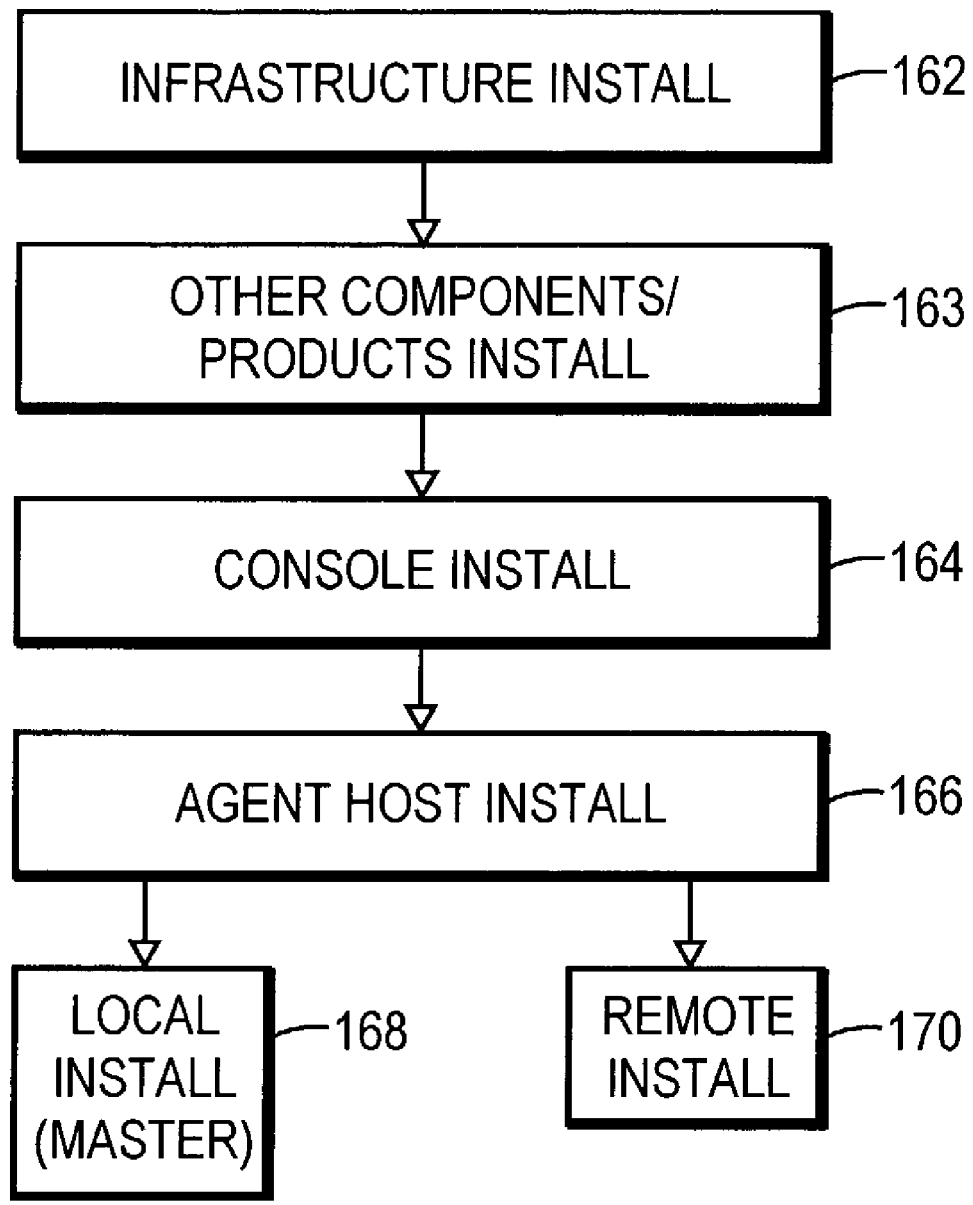
FIG. 5 is a functional schematic illustrating installation order for components of the storage management system of FIG. 1.
Figure 6:
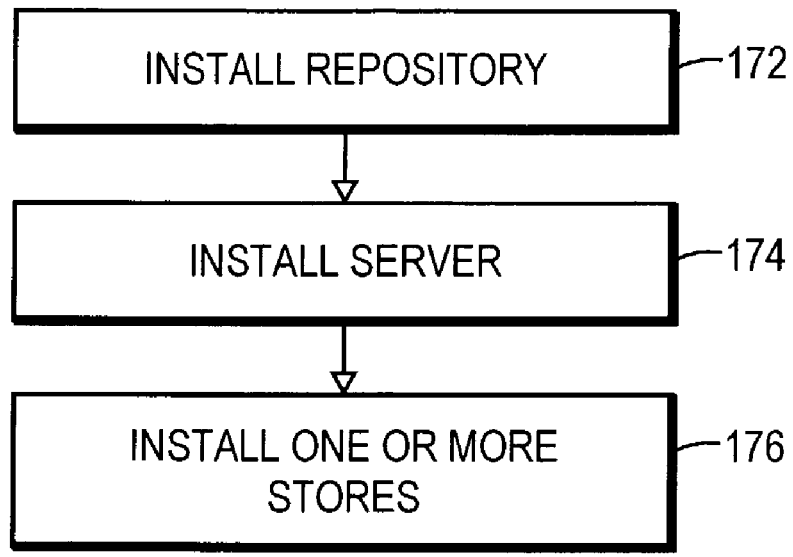
FIG. 6 is a flow diagram showing steps of installation of components comprising the infrastructure tier of the storage management system of FIG. 1.

Reference is now made to FIGS. 5 and 6, wherein the general installation process is overviewed. In step 162, the infrastructure is installed, and in step 163 other components or products may be installed. The console tier is installed in step 164, and host agents are begun to be installed in step 166. Sub-steps to step 166, the local install (of Master Agent or other components) occurs in step 168 and a remote install of product agents occur in step 170. The techniques described for remote install are also useful for installing other types of components, but for simplicity explanation in the examples will dwell on install of remote product agents. The installation of the infrastructure includes installation of the repository, server, and one or more stores in that order, as shown in steps 172, 174, and 176, respectively. In order for the installation processes to function properly, the repository, server, and at least one store must be installed. The components that enforce the states as described above with reference to FIGS. 3-4 ensure these rules are followed.

Figure 7:
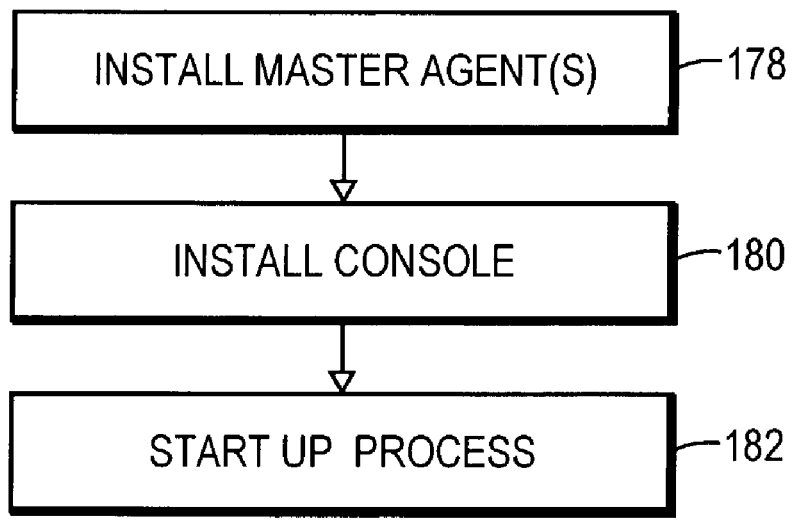
FIG. 7 is a flow diagram showing steps involved in the remote install process shown in FIG. 2 for the storage management system of FIG. 1.

Remote Install of Component in a Data Storage Management System, Including Install of a Remote Agent FIGS. 7-10 describe the remote installation process. FIG. 7 shows basic steps for preparing for remote installation of software components of the Data Storage Management System, and in the example embodiment that includes remote installation of Product Agents. The first step in that case is step 178 the installation of Master Agent(s). Next step 180 is install Console, and step 182 is the general start up process which is discussed in more detail starting at FIG. 8.

Figure 8:
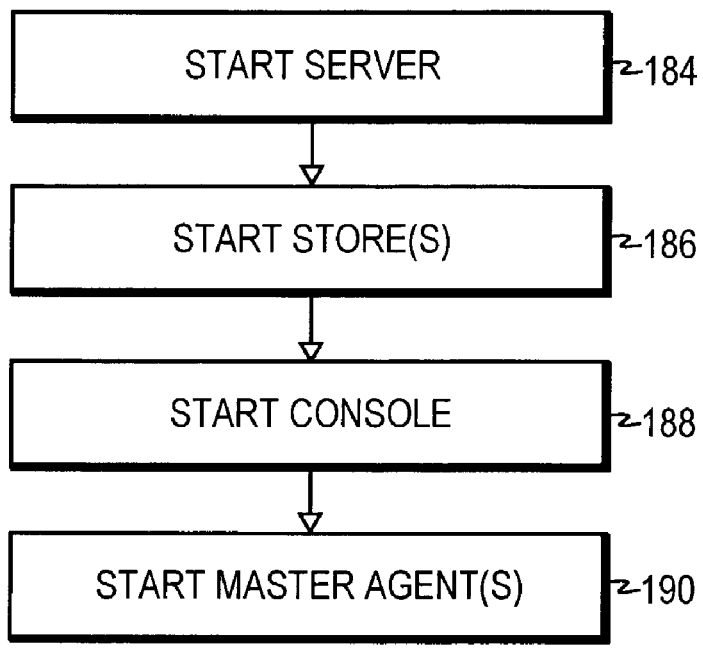
FIG. 8 is another flow diagram showing steps involved in the remote install process shown in FIG. 2 for the storage management system of FIG. 1.
Figure 9:
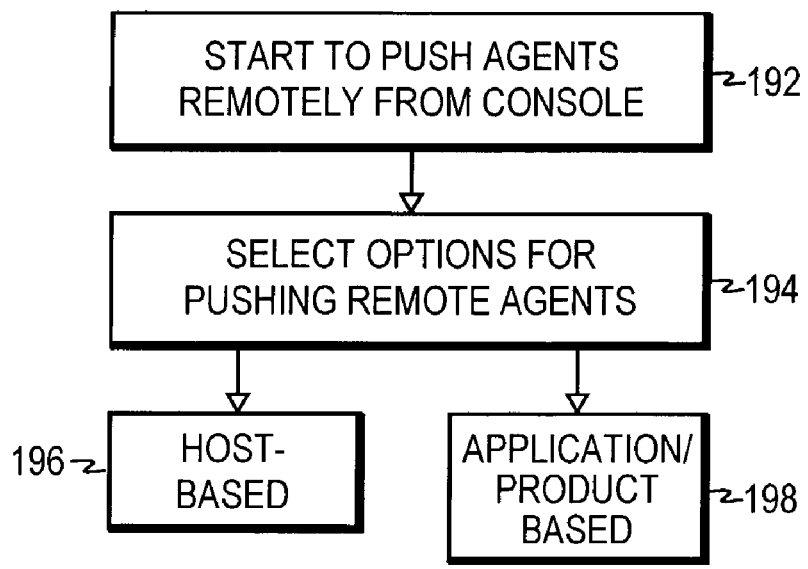
FIG. 9 is another flow diagram showing steps involved in the remote install process shown in FIG. 2 for the storage management system of FIG. 1.

Referring to FIG. 8, once the components are installed, the remote installation process further requires that certain components be started, including the server, one or more stores, the console, and the Master Agent for the host on which product agents are desired to be installed remotely, and these steps are shown at 184-190, respectively. In step 192 (FIG. 9), the starting of pushing agents remotely from a console (as will be shown in example GUI screens starting at FIG. 11) begins. Options for pushing remote agents is selected using GUI screen at the console in step 194. Options include a host-based install of agents (step 196) or software application- or product-based (step 198).

Figure 10:
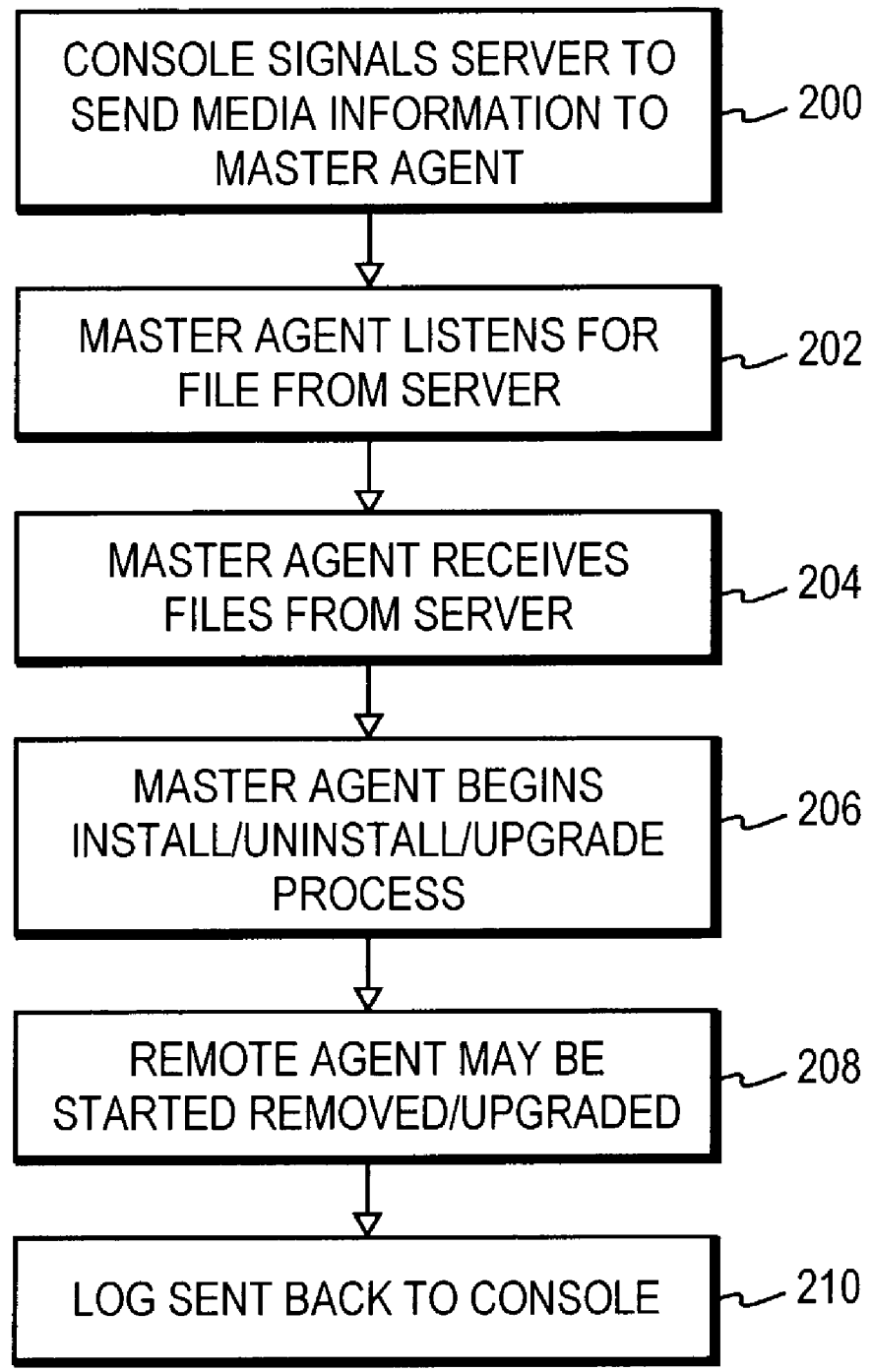
FIG. 10 is another flow diagram showing steps involved in the remote install process shown in FIG. 2 for the storage management system of FIG. 1.

Once the components are started, and options selected, the overall remote installation process can be gotten underway as shown in FIG. 10. In step 200, the Console signals the server to send media information from the media repository 120 at the Server 118 (FIG. 1) to the Master Agent (e.g., Master Agent 136) on the host (e.g. Host 132) for which the remote push is intended. In step 202, and at the host, the Master Agent listens for one or more files from the Server, the contents of which file will be described in more detail below. Once sent, the Master Agent receives the files from the Server in step 204, it begins the remote install process in step 206. Alternatively, the same steps can be used for an uninstall or upgrade push for product agents once installed on the host. Once installed, the removed agent can be started, or alternatively removed or upgraded, in step 208. In step 210, a report or log is sent back to the console and the remote operation is complete.

Generally, in carrying out the steps described above, the Server is also listening to the console and processing the transactions from the console and initiating the transaction and distribution of these files. The Server is responsible for opening up a socket, and sends the data files for the appropriate agent down to the master agent. At that point, the Master Agent unpacks all these files from a zipped file and then unzips it to a temporary location. In the preferred embodiment, a Perl language script is used to unpack the files from the server. The unpacked file will contain all that is needed for the component to be remotely installed, such as a product agent, including any executable code, configuration files, and libraries needed for the component, such as an agent, to operate. Additionally, the unpacked file will contain a so-called answers file that has been built by the console. Preferably, the console using XML protocols generates the answers file. When a user uses GUI screens at the console (FIGS. 11-16) to select remote install of a component such as an agent, a dialog occurs that is driven by execution of XML files stored in the Media Repository 120. The XML files are used per component such as an agent to define user input that's required for that agent. For example, in response to a user at the Console selecting a particular agent type to install, the Server sends from the Media Repository 120 the XML file associated with the agent and that is parsed by the console and used to display the dialogue presented at the user interface screen of the console (if user input is needed). The answers are then put into the above-mentioned answers file.

The answers file is sent along with the media in the packed file for the Master Agent to use in conjunction with an installation script that it launches on the target or remote host. This action creates configuration files for the remotely installed Agent so that it can in turn execute properly.

Figure 11:
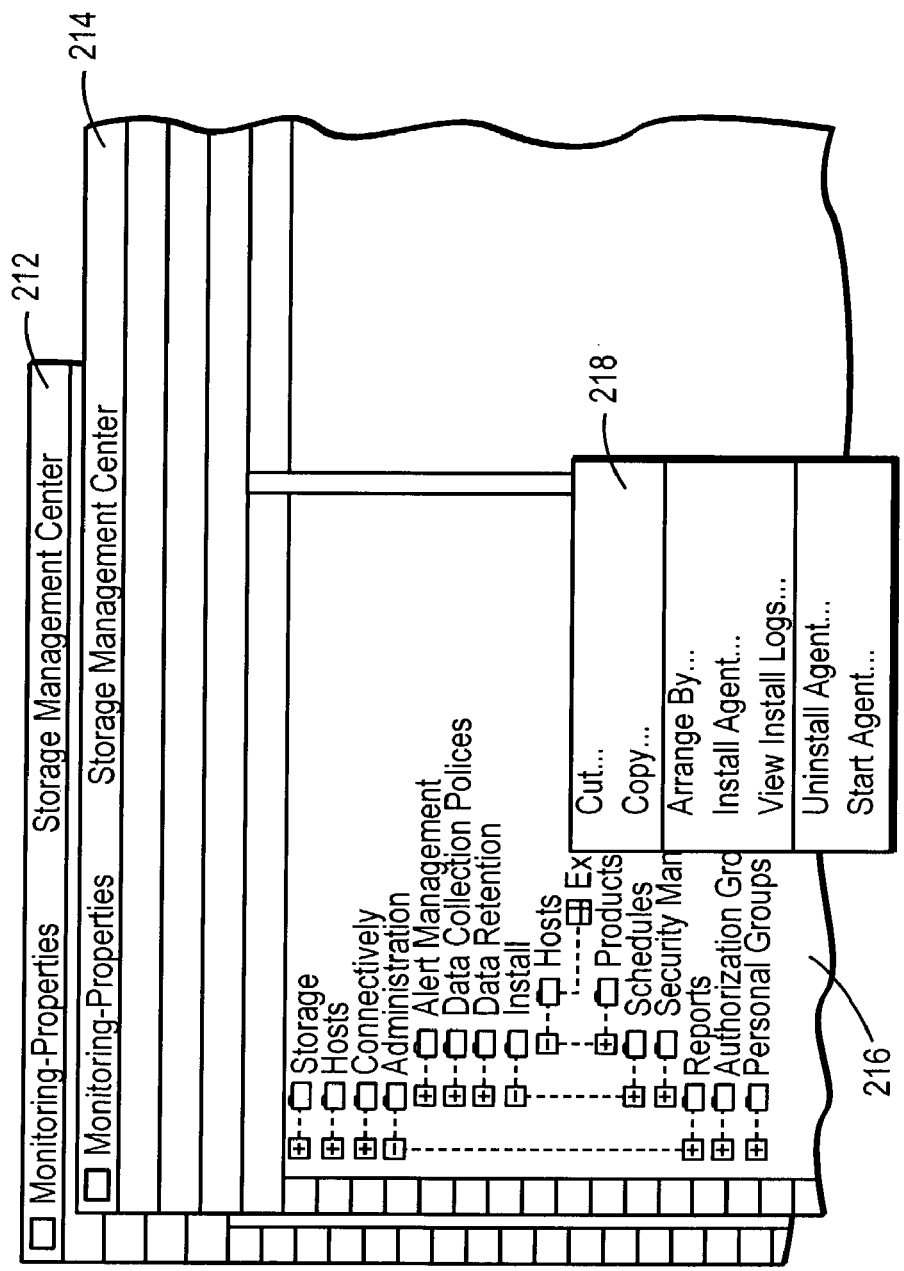
FIG. 11 shows a user interface useful for carrying out steps of the process of installing agents remotely as shown in FIGS. 7-10.
Figure 12:
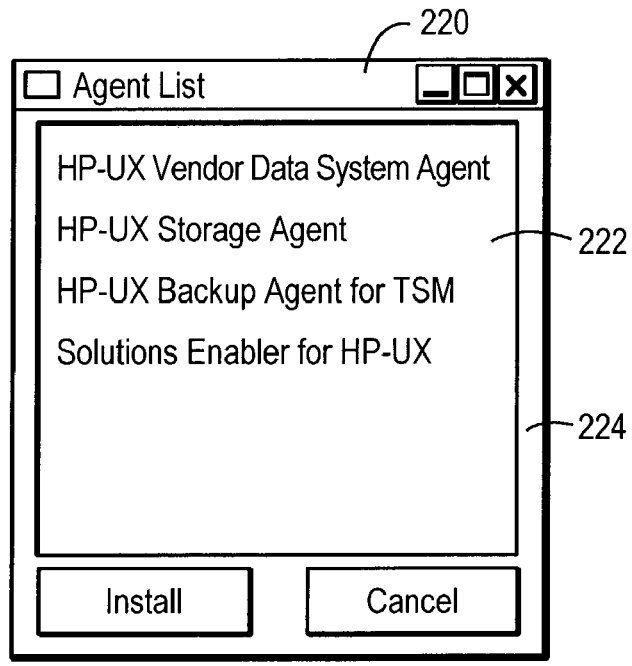
FIG. 12 shows another user interface useful for carrying out steps of the process of installing agents remotely as shown in FIGS. 7-10.

FIGS. 11-16 show GUI screens at the console useful for carrying out the above-described installation steps. Referring to FIG. 11, Window title-bar 212 and 214, respectively entitle installation menu screens for remote install. In area 216, various components and reports and actions related to them may be selected, such as Storage, Hosts, Connectively, Administration, Reports, and Authorization and identification related to Groupings of Users and components. Actions shown in window 218, include an "Install Agent" Action, that when selected may start the remote installation process for a product agent. FIG. 12 shows a drop down menu including an agent list (designated in title area 220), with specific agent selections to be picked in area 222 and an Install and Cancel button in area 224 may invoke the choices.

Figure 13:
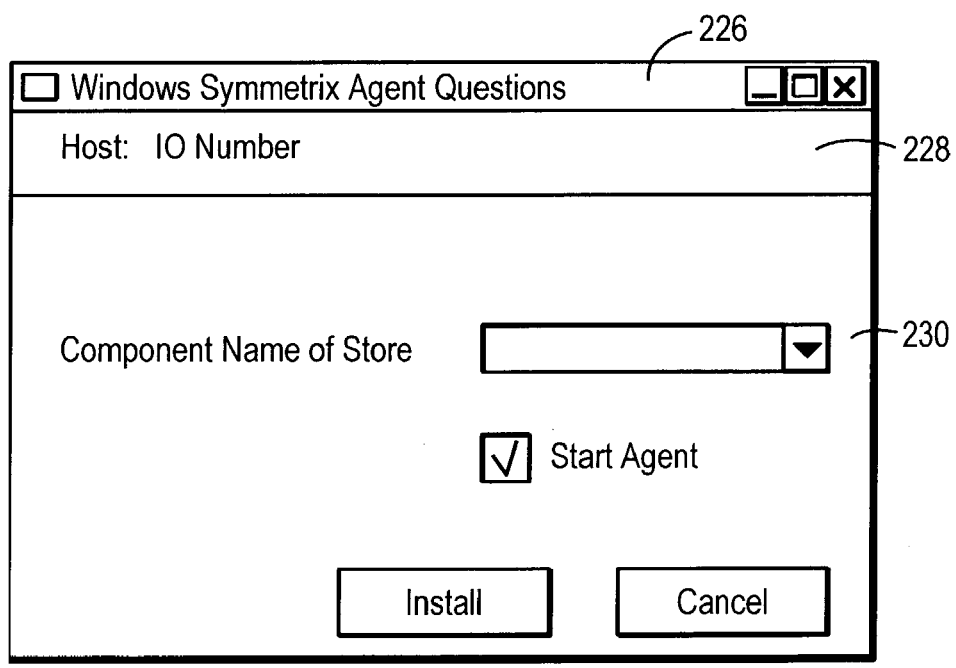
FIG. 13 shows another user interface useful for carrying out steps of the process of installing agents remotely as shown in FIGS. 7-10.

A dialog screen is shown in FIG. 13, wherein after selecting an agent for install, a questions dialog identified in title area 226 for the specific agent appears. The host is identified in area 228, and the use may browse for the component name of the relevant Store in area 230, and where the user may also further select to Start Agent (to have agent start automatically) and continue with Install or Cancel. It is a good choice to allow the user to preplan for the questions by filling out an implementation worksheet before actually installing the agent through the pushing action remotely. Generally, in the case of the preferred ECC Data Storage Management system it is a good choice to have the selected Agent start automatically unless it is the database agent for communicating with either the Main or Media Repository. Clicking on Install in area 230 (FIG. 13) installs the selected Agent on the selected host. A log file automatically generates and displays the agent installation details such as timestamp, status, agent name, and auto start settings.

Figure 14:
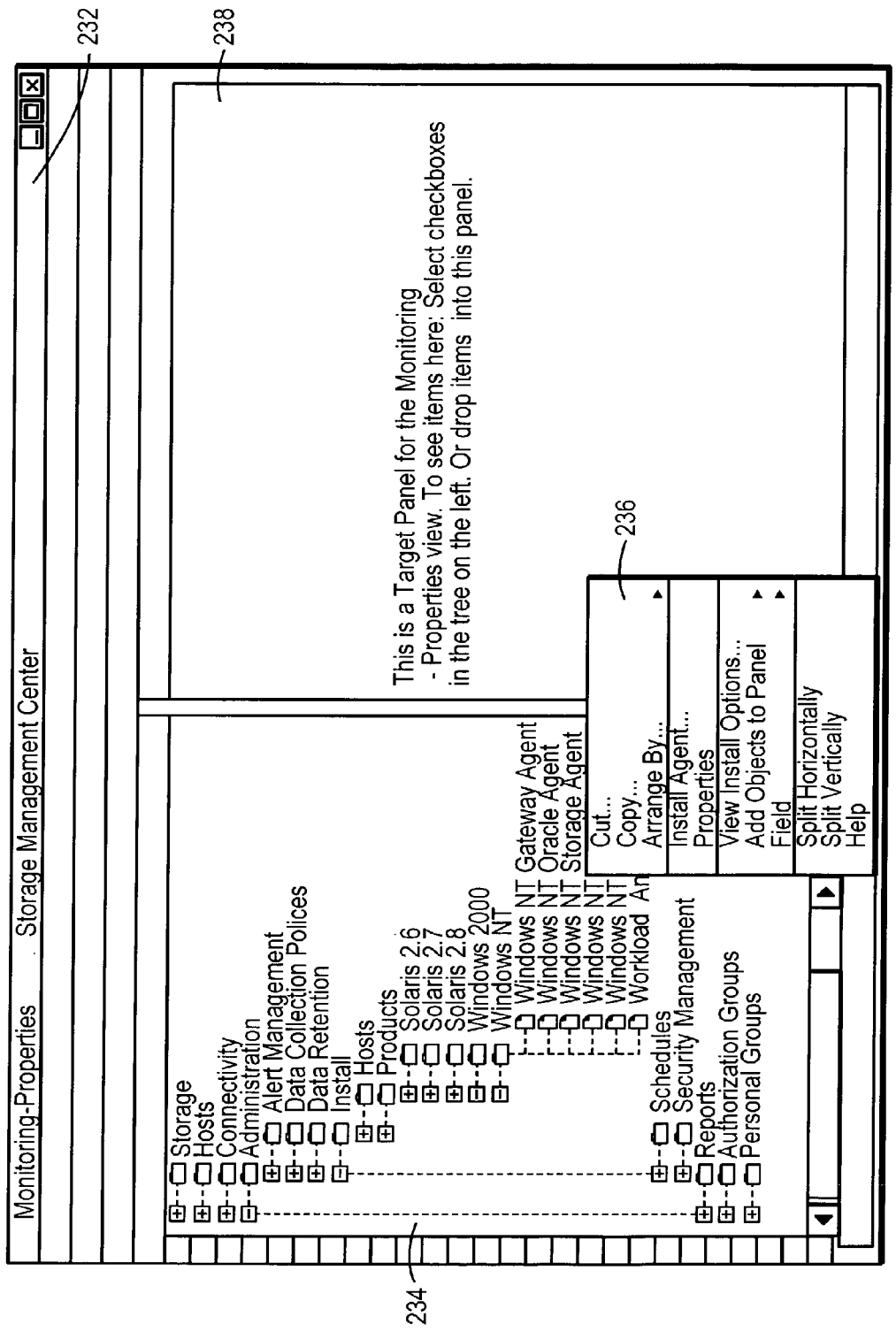
FIG. 14 shows another user interface useful for carrying out steps of the process of installing agents remotely as shown in FIGS. 7-10.

FIG. 14 shows a screen interface useful for installing an agent on multiple hosts. Area 232 carries a title showing that this screen is typically used for monitoring properties. Area 234 shows a selection tree, in which by user selection, expansion of action titles, such as Administration, Install, Products allow selection of an operating system to match that which is installed on the desired host so that the Agent is correct in type. With the Agent selected, a right-click display a drop down menu 236, in which an action for "Install Agent," may be selected.

Figure 15:
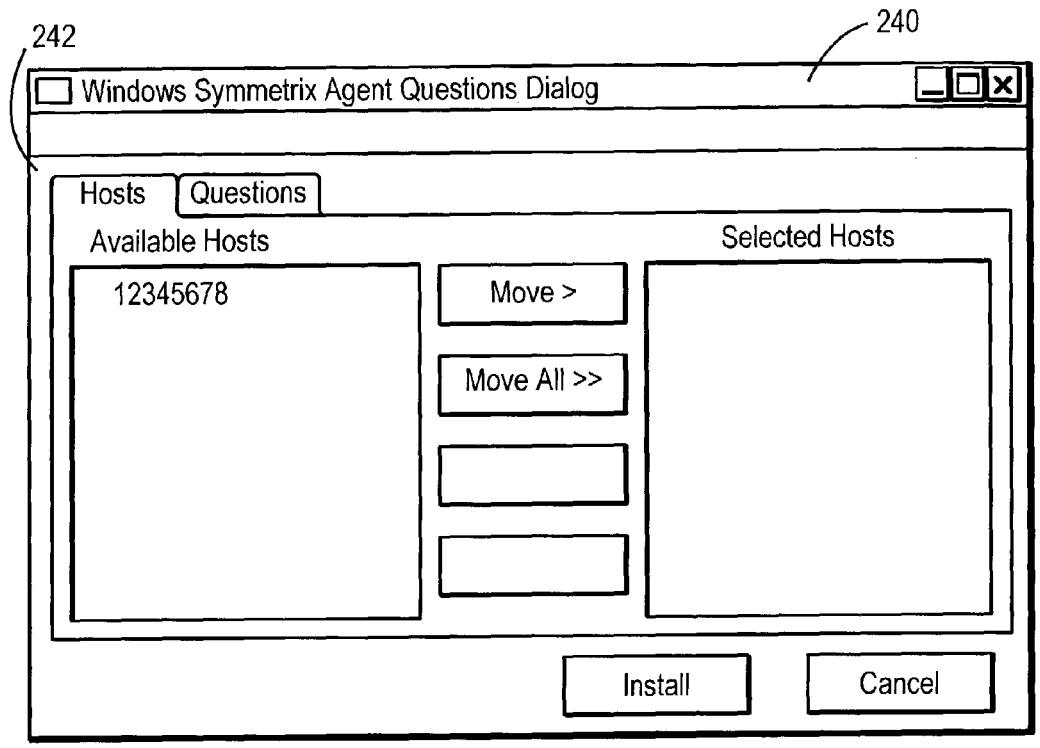
FIG. 15 shows another user interface useful for carrying out steps of the process of installing agents remotely as shown in FIGS. 7-10.
Figure 16:
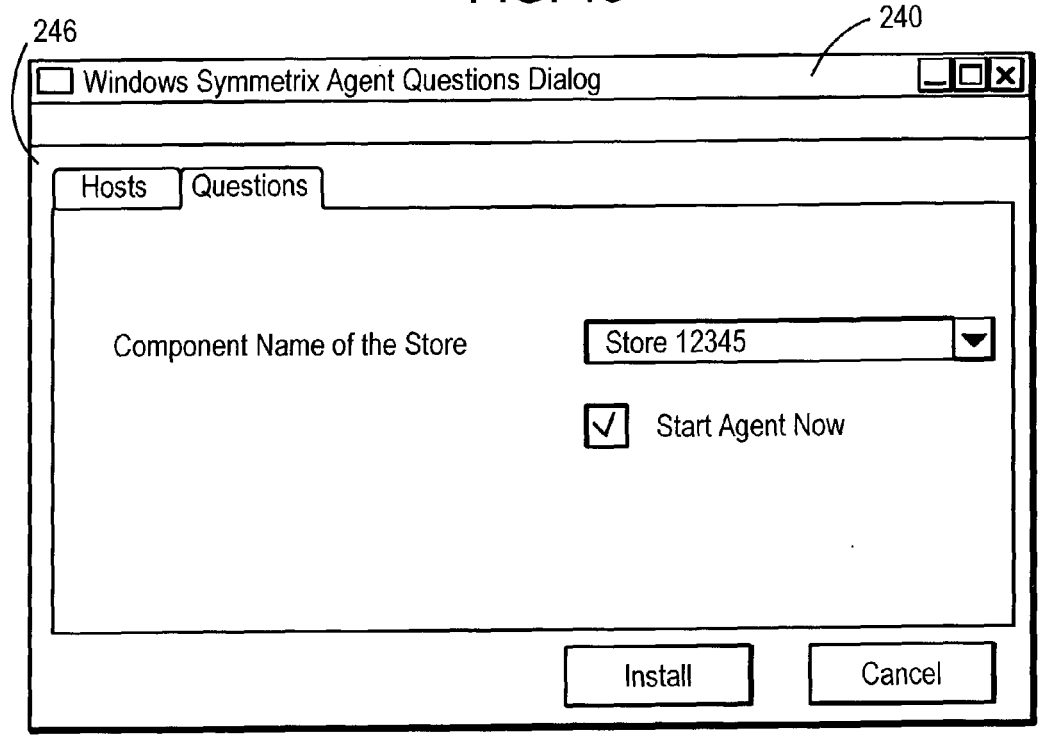
FIG. 16 shows another user interface useful for carrying out steps of the process of installing agents remotely as shown in FIGS. 7-10.

FIGS. 15 and 16 follow the selection of Install Agent, wherein the appropriate Agent, such as a Storage Agent for Symmetrix is available for install. In the example shown in FIG. 15, a "Windows Symmetrix Agent" is shown in title area 240 because it was selected by the user in this example case using the screen of FIG. 14. In this example, the selected Host is running the Windows operating system and the data storage system being communicated with is an EMC Symmetrix. Hosts are listed in area 242, which match the operating system, and which are not unavailable for some reason, and in this example the user has only available. In FIG. 16, following selection of the host above, the user may select in area 246 the Store, and here in this example it is Store 12345, then auto start can be selected by clicking on "Start Agent Now." Clicking on Install installs the Agent on the selected host, which could have been more than one, if so available, and selected, and then a report Log is generated as described above.

As described above, the Remote Installation is invoked by the Master Agent (via the Console Admin GUI), and a detailed example is now given to further illustrate the preferred embodiment. The following example details a remote installation of an Agent on a remote host from a Console presenting GUI screens similar to those shown in FIG. 11-16 In a preferred embodiment, the installation script set consists of five files, and is driven by a Perl "engine", which interprets command files containing the correct sequence of installation steps. In this example installation scripts utilize the same mnemonic used for agent naming, i.e., "ABC510", where "ABC" corresponds to the three-letter agent mnemonic, and "510" refers to a version number of the preferred ECC product from EMC (V5.1.0). Thus the files contained in the installation script set are as follows: installABC510.pl, installABC510.ecf, ABC510.rcfile, installABC510.xml, and unpack.pl The installABC510.pl, installABC510.ecf, and the ABC510.rcfile are contained within a zip file, installABC510.zip, along with all of the files necessary for the agent to execute. These files may include, but are not limited to, the agent executable, abcagent, the ABC.ini file, and another zip file, ABC510.zip, containing files to be used by the agent executable. The installABC510.zip file, the unpack.pl file, and the installABC510.xml file all reside on the Server in its Media Repository. The Media Repository maintains a directory for each agent available to be installed:

The ABC510.info file resides in the agent's directory in the Media Repository, and is used by the Server. It is NOT passed to the remote host during the installation. The Server uses this file to populate the PRODUCTS Table with information about the agents available to be installed.

The installABC510.xml file is used by the Console Admin GUI, to create a dialog, which allows the user to set some of the parameters needed for the remote installation. The Console Admin GUI then generates a new file, installABC510.answers, which is used by the installation script set. If no user input is required, the .XML file should contain only a "Textline" entry:

Table 1 shows a sample XML file for creating a simple dialog box:

TABLE 1

```
<textline text="This is an example of a simple dialog composed through xml."/>
    <question type="TEXTFIELD"
        name="Text"
        label="This is a text field:"
        default="This is the default answer"/>
    <question type="COMBOBOX"
        name="Combo"
        label="This is a combo box:"
        options="Option 1, Option 2"
    <question type="CHECKBOX"
        name="Check"
        label="This is a check box."
        options="True, False"
        default="True"/>
    <button text="Install" action=" Install"/>
    <button text="Cancel" action=" Cancel"/>
```

Table 2 shows a sample installABC510.answers file:

TABLE 2

```
Text=This is the default answer
Combo=Option 1
Check=True
SERVER_HOST=7236emc
SERVER_PORT=5799
STORE=store7236emc
```

During an INSTALL transaction, the installABC510.zip, installABC510.answers, and unpack.pl are sent from the Server to the remote host's Master Agent. The Master Agent stores the files in a temporary directory under its own running directory, e.g., $ECC_HOME.

In the preferred embodiment, and continuing with the example of a remote agent install, the unpack .pl file is a Perl script which is invoked by the Master Agent to begin the install process. The unpack.pl script creates a directory of the agent's name, at the same level as the Master Agent's running directory, $ECC_HOME/ABC510, then unzips (using info-zip) the installABC510.zip file into this directory. The next thing unpack.pl does is invoke the agent-specific install script, installABC510.pl, passing installABC510.answers and ECC_HOME as arguments:

The installABC510.pl file is the perl "engine", which runs by interpreting its own command file, installABC510.ecf. The .pl file begins by parsing any variables it needs from the answers file passed to it. It then begins to read and interpret the .ecf file, which holds the sequence of commands necessary to run the install. The .ecf file is specific to each agent, but in most cases it: (1) moves the installed agent to the proper directories; (2). writes install-environment information to the agent's ABC.ini file; (3) writes install date and install status to the agent's ABC510.rcfile; (4) writes a new block to the

[Agent Specific Info] section of the Master Agent's ctg.ini file, for the agent being installed, including but not limited to, the agent's type, version, and execution string.

The ABC510.rcfile is used by the Master Agent to determine whether or not the remote agent install was successful. This file's appearance prior to install is shown in Table 3 below:

TABLE 3 timestamp=YYYY.MM.DD.HH:MM:SS
status=FAIL
program=abcagent
agent=ABC
autostart=TRUE
STORE=store7236emc During the install, the .ecf file gets the current date and time, and writes it to the .rcfile. Upon completion of a successful agent install, the .ecf file substitutes the string "SUCCESS" for the string "FAIL".

This file's appearance following installation is shown in Table 4 below:

TABLE 4 timestamp=2001.01.19.11:15:03
status=SUCCESS
program=abcagent
agent=ABC
autostart=TRUE
STORE=store7236emc The ABC510.rcfile is then moved to the proper directory, e.g. the $ECC_HOME directory mentioned above in the example. When the Master Agent detects a new rcfile in this directory, it invokes the agent executable, for the new agent, starting that new agent. When the install script, installABC510.pl, returns successfully to unpack.pl, the last thing unpack.pl does is remove any temporary install-related files from the agent's install directory, to free up diskspace.

Remote Uninstall and Upgrade Functions

The following is an example of a Remote Agent uninstalls which functions in a manner similar to the install. It is invoked by the Master Agent, via the Console Admin GUI. The agent being removed must be STOPPED via the Console before attempting the uninstall. There are just two files necessary for the uninstall, ununpack.pl and uninstallABC510.zip. They are both delivered when the install is delivered, and are already present on the remote host. The uninstallABC510.zip file does not have to be an actual zipfile, but it is convenient to name it as one so that it conforms to the protocol expected by the Master Agent to run an install so that it can be convenient to run an uninstall in a similar manner. The unpack .pl file is a Perl script which is invoked by the Master Agent to begin the uninstall process.

The ununpack.pl script edits the Master Agent's ctg.ini file, removing the block corresponding to the agent being uninstalled. It then removes the agent's install directory, and all files associated with the agent from the Master Agent's running directory. Finally, the ununpack.pl script renames the uninstallABC510.zip file, to uninstallABC510.rcfile, and writes it to the Master Agent's exec directory, with the status of the uninstall. When the Master Agent returns the logfile and status to the Console, the Console's Admin GUI invokes a sql script which removes the agent's component from the Repository, completing the uninstall of the agent.

An upgrade may also be performed in a similar manner and an example is now given. It is best to perform an upgrade on each host running a Master Agent, after the Infrastructure (Repository, Server and Store) has been upgraded, and after the Console has been installed at an upgrade level. Each remote host and more than one may be selected for an upgrade may be selected from the Console.

The files contained in the remote upgrade script set are as follows: 510Upgrade.pl; installEGG.pl; E*G510.rcfile; InstallE*G510.zip; and InstallE*G510.xml. Wherein, E*G refers to EAG, EHG, ENG, or ESG, depending on the operating system of the remote machine, i.e., A=AIX, H=HP–UX, N=Win32, S=Solaris. The installEGG.pl, and the E*G510.rcfile are contained within the zip file, installE*G510.zip. Also included in the installE*G510.zip file are individual agent zipfiles for every agent which may have been installed on that OS when an earlier version was installed. These are identical to the agent zipfiles used for normal remote agent installs. These individual zipfiles may include, but are not limited to, the agent executable, abcagent, the ABC.ini file, and yet another zip file, ABC510.zip, containing files to be used by the agent executable.

The installE*G510.zip file, the 510Upgrade.pl file, and the installE*G510.xml file all reside on the Server host, in its Media Repository. The Media Repository maintains a directory for each operating system where the Upgrade can be installed:

The installEGG.pl file searches for and upgrades any agents, including the Master Agent, which are installed at version 5.0.x and then upgraded to a later version 5.1× in this example. In doing so, it performs the functions shown in Table 5.

TABLE 5

1. Finds any directories in the Master Agent's exec directory that are old level.
2. Renames any agent executables in those directories to <agent_exe>.old. (so that they can never be restarted by the Master Agent with the exec path currently written in the ctg.ini.)
3. Sends a Shutdown request to each 5.0.x agent installed.
4. Checks each agent's.lck file, to make sure the agent has shutdown.
5. Loops through a list (OS-specific) of agents and components to upgrade, including, but not limited to, the Master Agent and the esnapi.
6. Creates a new ABC510 directory for each upgraded agent.
7. Moves old, 5.0.x, agent configuration files (.ini files, COMFILES, etc.) to the new directory.
8. Unzips the individual agents installABC510.zip file into the new directory.
9. Keeps an array of agents successfully upgraded and updates the ctg.ini with the correct versions and exec paths for the agents upgraded.
10. Writes install date and install status to the upgrades's E*G510.rcfile.
11. Writes an entry in the Master Agent's ctg.ini for the upgrade, to record it's own completion.
12. Moves the E*G510.rcfile to the Master Agent's exec directory, to signal the end of the upgrade.
13. Deletes the temporary Upgrade directory and files.
14. Restarts the Master Agent (on upgrade only), and with it, all other upgraded agents.

Local Install of Component in a Data Storage Management System, Including Install of a Master Agent and Centralized Control In addition to the remote install process above, one embodiment of this invention includes local installation of components, including local installation of the infrastructure components of the Data Storage Management System and local installation of a Master Agent on a host computer, all of which may be performed with centralized control as described herein. Although product agents may also be installed locally, that is not described in the exemplary embodiment for simplicity and because of the advantages and ease of installing product specific agents remotely once a console is installed.

With regard to general installation, which is applicable to basic steps required for remote installation and also for local installation, FIGS. 6 and 7, described above, show the order of install, i.e. Main Repository, Server, at least one Store, and either Console or Master Server can be installed next. FIG. 4 shows that certain orders of state transitions (states 0-3) must also be followed, and FIG. 3 shows that certain components function to ensure that the states are completed in order while other rules are also enforced.

Figure 17:
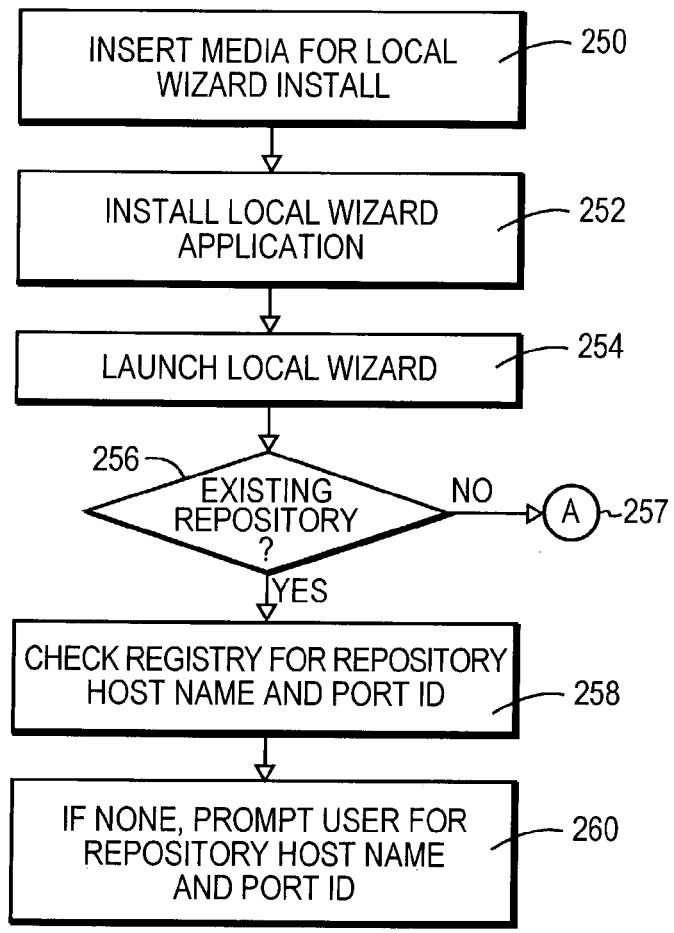
FIG. 17 is a flow diagram showing steps involved in the using the state machine function for carrying out a local install of components of one or more tiers of the storage system of FIG. 1.
Figure 18:
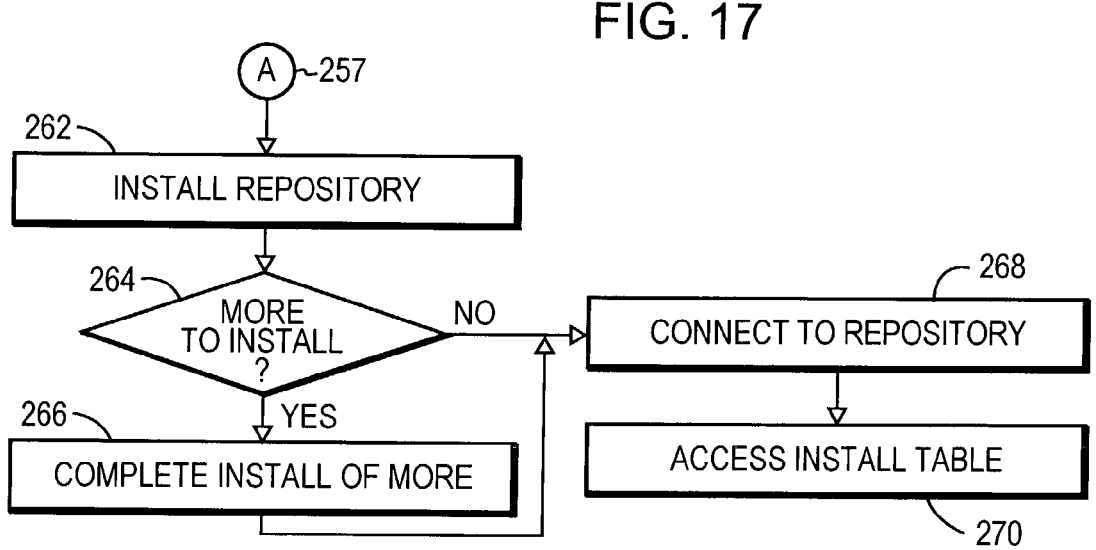
FIG. 18 is another flow diagram showing steps involved in the using the state machine function for carrying out a local install of components of one or more tiers of the storage system of FIG. 1.
Figure 19:
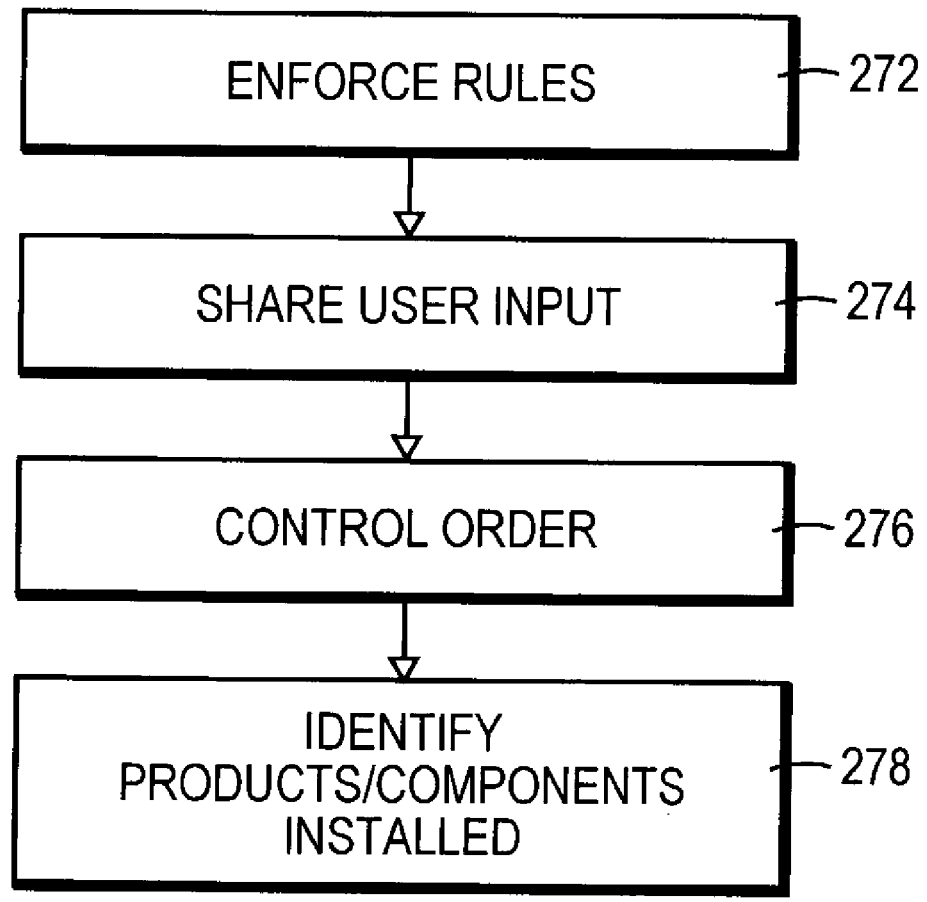
FIG. 19 is another flow diagram showing steps involved in the using the state machine for carrying out a local install of components of one or more tiers of the storage system of FIG. 1.

A general installation of a locally installed component, which may be one or more components of the infrastructure or a Master Agent on a host is shown and described in reference to FIGS. 17-19. Step 250 of FIG. 17 shows the step of inserting media, e.g. a CD-ROM for Local Wizard Install in step 252, and wherein general instruction code is installed in memory of the computer hosting the component installation, identical to that described with reference to FIG. 2. In such a case the host computer having other product specific agents, and in a similar fashion, changes from a general purpose digital computer that becomes a special purpose digital computer with installation of a component of the Data Storage Management System. The Wizard, is a software process, and the Wizard embodiment is only an example of a style of software application, that is a good choice for install because it makes it relatively easy for the user who has inserted the media to go through with the desired install operation. The Wizard is launched (i.e., started and becomes a computer-implemented process as a program executing in memory) in step 254. Then in step 256, a computer-based question is asked to determine whether there is a new or existing repository (user screen related to this is shown and described with reference to FIG. 22). If the answer is yes, then in step 258 computer-based information, such as a Windows registry is checked to determine the host name for the repository and its respective port id, and if not found the user is prompted to enter a repository host name and port id in step 260. If however the answer is No, the connecting step 257 "A" flows into the same connecting step shown in FIG. 18.

Reference is made to FIGS. 18 and 19 now. Referring to FIG. 18, the user is then prompted to install the repository, which (necessary to get from State 0 to State 1) in step 262. If in step 264, it is determined that there is more to install, then in step 266, the install of more components is completed, and then in either case processing flows to step 268 for a connection to the Main Repository and access to the Install Table 160 in step 270 is used to further enforce the required state transitions, thus functioning as a state machine with additional function. These functions are shown in the flow diagram of FIG. 19, and includes enforcing rules, sharing user input, controlling order, and identifying products/components that are installed, in respective steps 272, 274, 276, and 278.

Figure 24:
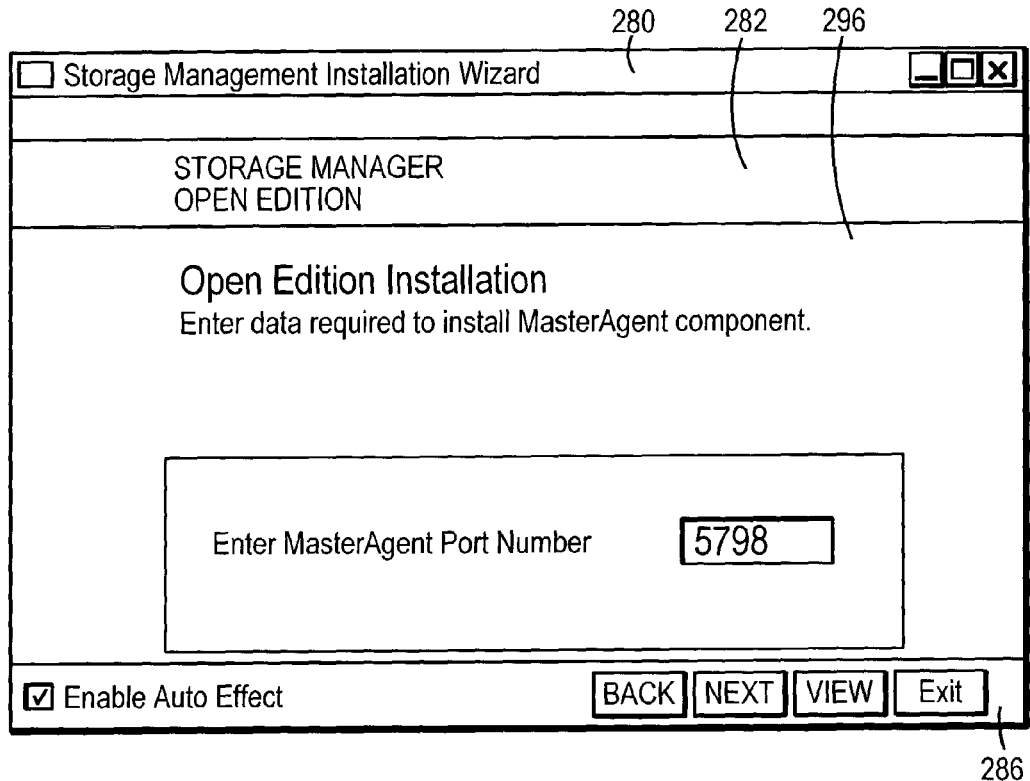
FIG. 24 shows another user interface useful for carrying out steps of the process of installing components locally as shown in FIGS. 17-19.
Figure 25:
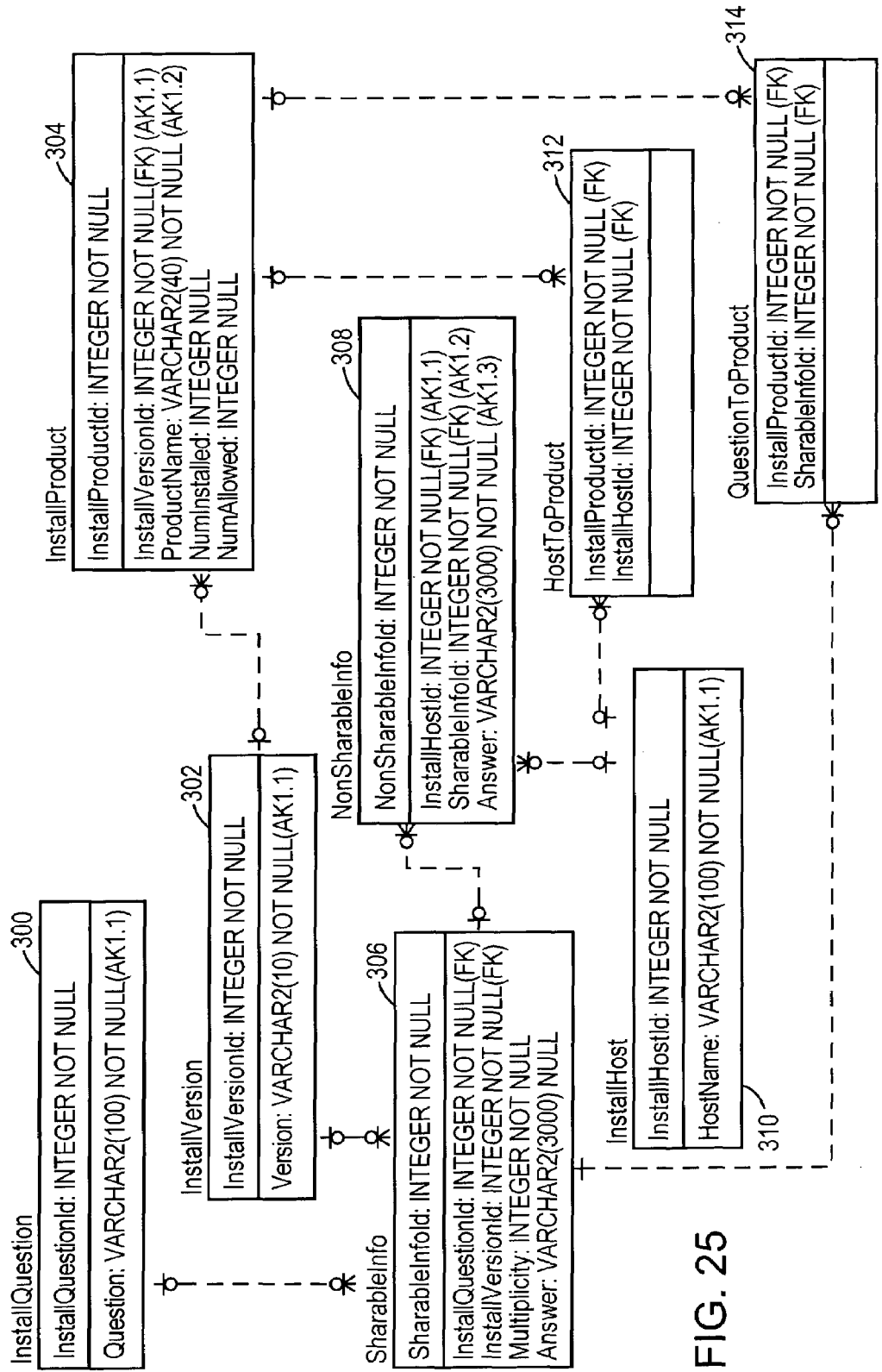
FIG. 25 is a schematic of logic modules useful for carrying out steps of the process of installing components locally as shown in FIGS. 17-19.

The Install Table 160, which is part of the Main Repository, i.e. a table within a database, in a preferred embodiment, is shown in FIG. 25 and described in detail below. The Table entries are gathered and compiled from user input that is gathered using the Install Screens shown in FIGS. 20-24.

Figure 20:
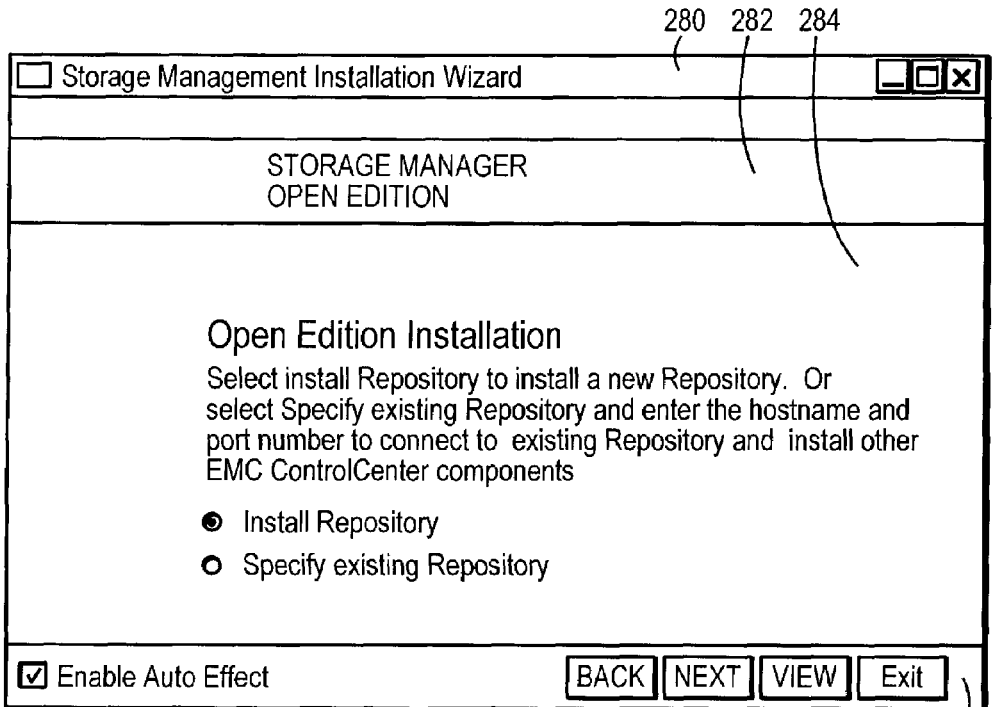
FIG. 20 shows a user interface useful for carrying out steps of the process of installing components locally as shown in FIGS. 17-19.
Figure 21:
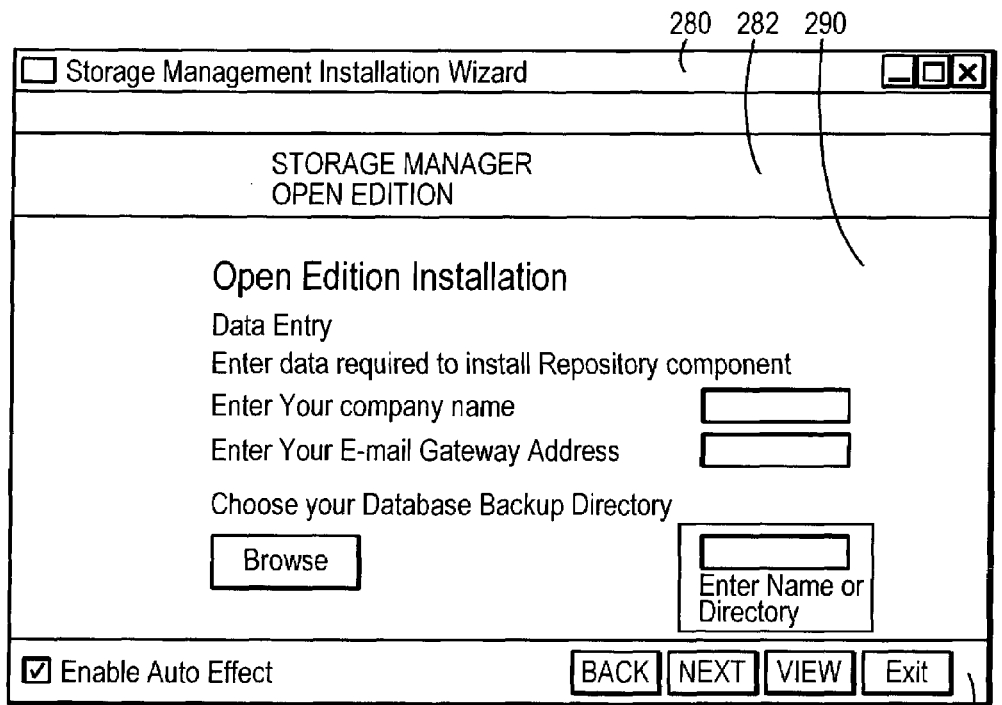
FIG. 21 shows another user interface useful for carrying out steps of the process of installing components locally as shown in FIGS. 17-19.
Figure 22:
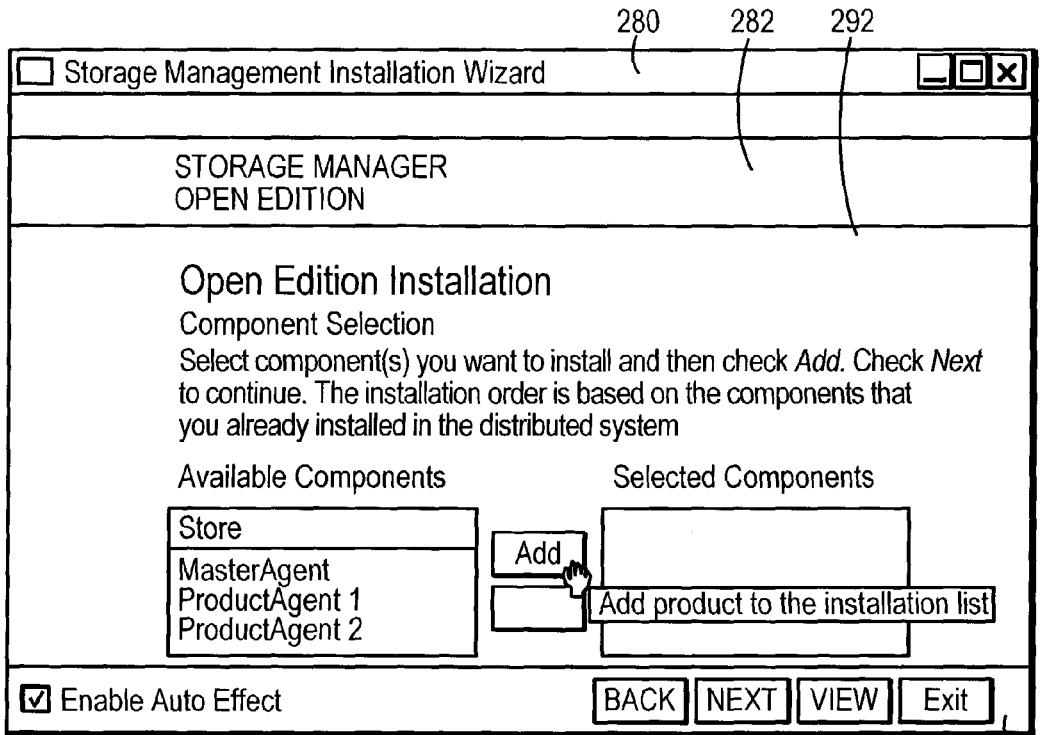
FIG. 22 shows another user interface useful for carrying out steps of the process of installing components locally as shown in FIGS. 17-19.
Figure 23:
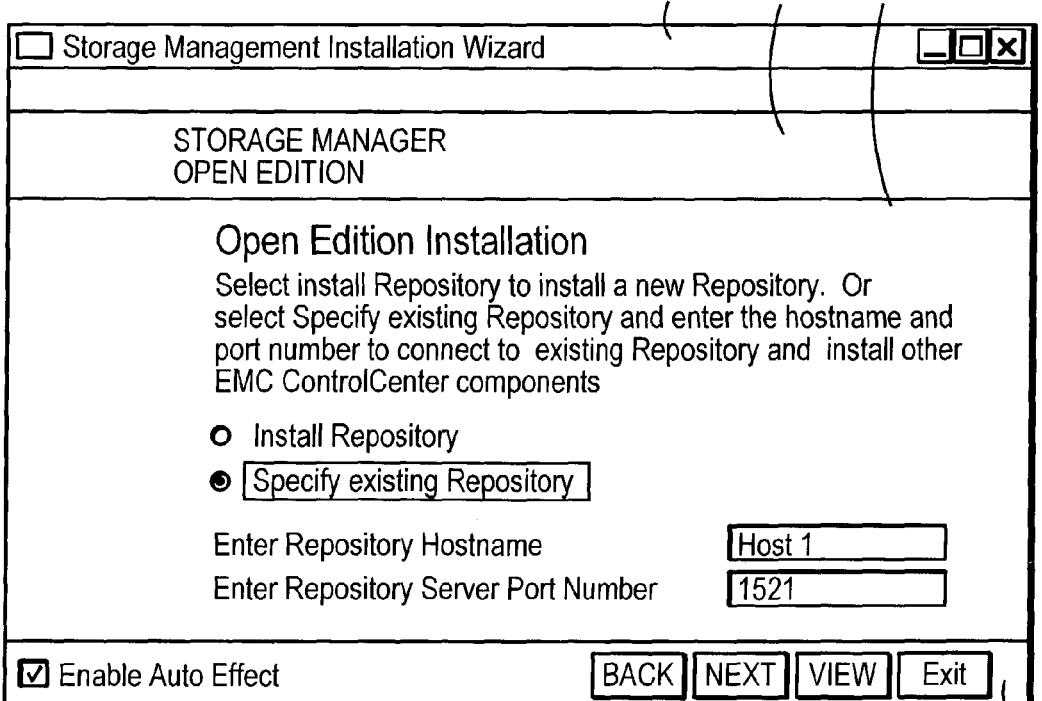
FIG. 23 shows another user interface useful for carrying out steps of the process of installing components locally as shown in FIGS. 17-19.

Reference will be made to FIGS. 20-24 now. FIG. 20 shows a user interface screen wherein a title area 280, common to all the user screens shown in FIGS. 20-24 denotes a descriptive title "Storage Management Installation Wizard," and title area 282, also common, described "Storage Manager Open Edition," which in this example is similar to the preferred ECC Open Edition product. This shows a case where the user is asked to select in interaction area 284, whether it is necessary to install a repository or whether one may be specified. Area 286, common to the user screens shown in FIGS. 20-24 allows selection of options and actions after the selection in area 284 has been made. In FIG. 20, a representation depicts a case where the user has selected to Install a new Main Repository. FIG. 21 shows further screens presented in Area 290 when a user has chosen to install a new Main Repository as started by the example shown in FIG. 20. However, a different example is shown in FIG. 23, or it could be a case following the example case of FIGS. 20-21, in which the user specifies an existing Main Repository in area 284, and including the repository name and its server port number.

FIG. 22 shows a local installation of components available in area 292, including a Master Agent, and Product Agents, although, in the preferred embodiment, Product Agents are installed remotely from a console. The Installation order is based on components that have already been installed throughout the environment being managed by the Data Storage Management System 100. In FIG. 24, further data required to install the Master Agent so that it can communicate with the console and server is shown in area 296.

FIG. 23 shows a different example from that depicted in FIGS. 20 and 21 in which the user specifies an existing Main Repository in area 284, and including the repository name and its server port number.

Components of the Install Table 160 are shown in FIG. 25 and include field entries gathered from the user interaction and the general install (e.g. by checking the Windows Registry. Table entries include entries with descriptive names: including Entry 300 for answers to InstallQuestion (new or existing Repository, Entry 302 which describes the InstallVersion, Entry 304 which describes the InstallProduct, Entry 306 which describes the SharableInfo, Entry 308 describes NonSharableInfo, Entry 310 describes the InstallHost, Entry 312 describes the HosttoProduct, and Entry 314 describes the QuestiontoProduct.

The user interface screen presentation and dialog of FIGS. 20-24, and the completion of the Table 160 with entries generally shown in FIG. 25 is driven by the interaction through the screens and an XML file. An example of which is given now in Table 6 and contents are shown in Table 7.

TABLE 6

Content of MasterAgent_XML.xml file:
<?xml version="1.0"?>
  <SETUP>
        <INSTALL:DirectoryChooser xmlns:INSTALL="com.emc.ecc.installation."
           action="Choose installation directory"
           params="none"
           outputToken="INSTALL_DIR"

TABLE 6-continued

```
            sharability="0"
    ></INSTALL:DirectoryChooser>
<!-- Server Component Name -->
    <INSTALL:UserEditField xmlns:INSTALL="com.emc.ecc.installation."
            action="Enter Server Component Name"
            params="none"
            outputToken="ECCSERVER__NAME"
            sharability="1"
    ></INSTALL:UserEditField>
<!-- Server Port -->
    <INSTALL:UserEditField xmlns:INSTALL="com.emc.ecc.installation."
            action="Enter Server Port Number"
            params="5799"
            outputToken="ECCSERVER__PORTNUMBER"
            sharability="1"
    ></INSTALL:UserEditField>
<!-- MA Port -->
    <INSTALL:UserEditField xmlns:INSTALL="com.emc.ecc.installation."
            action="Enter Master Agent Port Number"
            params="5798"
            outputToken="MA__PORT"
            sharability="1"
    ></INSTALL:UserEditField>
<!-- NIC for MA to communicate with the Server -->
    <INSTALL:UserSelectionBox xmlns:INSTALL="com.emc.ecc.installation."
            action="Select ECCServer Network Name for MasterAgent Communications"
            params="none"
            outputToken="SERVERHOSTNAME"
            sharability="0"
    ></INSTALL:UserSelectionBox>
    </SETUP>
```

TABLE 7

Content of MTR500.answers file:
INSTALL__DIR=C:\ECC
ECCSERVER__NAME=svrhost1234
ECCSERVER__PORTNUMBER=5799
MA__PORT=5798
SERVERHOSTNAME=host1234.emc.com Generally, each component to be installed has a set of questions to be answered by the user (or system) in order to provide necessary data for the successful component initialization. This data is specified in component-specific xml files and sometimes is shared between components. So, for example, questions asked during ECCServer install might be relevant for the ECCStore(s) or Master Agents. In order to minimize human interaction, and subsequently human error, such information could be stored and later derived from the corresponding database tables. This data is specified in component-specific xml files and sometimes is shared between components.

An example of installing a Master Agent is given to present the "mechanics" of the ideas mentioned above. The Master Agent component requires the following information to be provided by the user, shown in Table 8:

TABLE 8

1. Choose Installation Directory
2. Enter Server Component Name
3. Enter Server Port Number
4. Enter Master Agent Port Number
5. Select ECCServer Network Name for MasterAgent Communications Which questions to ask and which graphical components to use to represent the question is defined in the product-specific *.xml file, e.g. MasterAgent_XML.xml for the Master Agent component. How much information could be deduced from the system and not requested from the user is determined by the sharability and params tokens specified for each question. The Sharability token defines whether answer to the question could be shared between more than one components. The Params token could contain a directive for the install utility to perform some system specific task, e.g., "server$NIC_PRIMARY" directive for the "Select Primary Network Name for ECCServer" question from the ECCServer_XML.xml file, would instruct install utility to acquire all available NIC's for a given server host programmatically.

In regards to the Master Agent installation, questions 2 and 3 of Table 8 are marked as sharable, since ECCServer component is the first to provide the answers and store them into the SharableInfo table entry of Table 160. (e.g., SharableInfoId=33, 35). Returning to the example, and question # 5, above, although this does not contain shareable information, it still could be deduced from the information stored in the SharableInfo table entry due to its semantics. This question represents a union of 2 other questions asked by the ECCServer install, —"Select Primary Network Name for ECCServer" and "Select Alternative Network Names for Console Communication". Collective answer to both of these questions defines network interfaces available for other components (Console, Master Agents, Stores) to communicate with the ECCServer host.

In this example ECCServer is installed in a non-multi-homed environment (has 1 network interface card), and thus answer to the question is contained in the corresponding entry for the "Select Primary Network Name for ECCServer" question (SharableInfoId=39), while second question (sharableInfoId=37) is ignored all together.

Below is an example from the InstallQuestion and SharableInfo table entries. A complete installation tables dump is contained in the InstallTableContents.txt file.

TABLE 9

InstallQuestion table

| InstallQuestionID | Question |
|---|---|
| 32 | Enter Server Component Name |
| 34 | Enter Server Port Number |
| 36 | Select Alternative Network Name for Console Communication |
| 38 | Select Primary Network Name for ECCServer |

TABLE 10

SharableInfo table

| SharableInfoID | InstallQuestionID | InstallVersionID | Multiplicity Answer |
|---|---|---|---|
| 33 | 32 | 1 | svrhost1234" |
| 35 | 34 | 1 | 5799 |
| 37 | 36 | 1 | none |
| 39 | 38 | 1 | host1234.emc.com |

In this example, there are 5 questions to be answered for the Master Agent component, but the user is aware only of one of it, which is question #4, while the rest of the information is acquired without requiring user input and recorded into the corresponding "answers" file. From the answers file information trickles down to the corresponding system initialization, e.g., Windows .ini files, which ultimately are used for respective components' startup.

Several embodiments of this invention have now been described and include a configuration for local installation of components, including Master Agents for Host Agents, and other components, such as a Server, Main Repository, and Console, and another embodiment for remote installation of components including Remote Product Agents, and an embodiment including a configuration for allowing, advantageously, the inclusion of both a process for Local and Remote Installation of components of a Data Storage Management System.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for installing software components of a data storage management system including data storage management server software as part of the software components, comprising the following computer-executed steps:

initiating the installation of a database, which is a repository representative of a first software component of the data storage management system, wherein the repository includes tabular data entries; wherein the data storage management system comprises a plurality of software components and manages a data storage environment, the data storage environment comprising a plurality of computers and a data storage system, the data storage system comprising a plurality of storage devices; wherein each component of the data storage system to be installed has a set of questions to be answered by a user or the system;

deducing, for each question of the set of questions, whether the guest ion is determinable from the system without user input through the use of a sharability and params token; wherein the sharability token defines whether the answer to a question is usable between components and the params token contains a directive for an install utility to perform a system task;

supplementing the information deduced from the system by soliciting further installation information from user input;

using the user input to populate selected ones of the tabular data entries that are used to function in a state machine capacity to enforce rules and order of installation of further software components of the data storage management system without further user intervention, wherein the selected ones of said tabular data entries populated by the user comprise answers to questions that are indicated to be shamble and shared between selected ones of said software components.

2. The method of claim 1, wherein data storage management server software for the data storage management system is installed following the installation of the repository and the order of installation is enforced by the state machine function.

3. The method of claim 2, wherein the tabular data entries are updated as other software components are installed in the data storage management system and these tabular data entries are used to identify software components installed in the data storage management system.

4. The method of claim 3, wherein the data entries are shared with other users or during other installation operations.

5. The method of claim 2, wherein one or more other software components are installed following the installation of the server and the order of installation is enforced by the state machine function.

6. The method of claim 5, wherein server software for the data storage management system is installed following the installation of the repository and the order of installation is enforced by using the tabular data entries in the repository.

7. The method of claim 6, wherein the tabular data entries are updated as other software components are installed in the data storage management system and these tabular data entries are used to identify software components installed in the data storage management system.

8. The method of claim 7, wherein the data entries are shared with other users or during other installation operational.

9. The method of claim 6, wherein one or more other software components are installed following the installation of the server and the order of installation is enforced by the state machine function.

10. A data storage management system including computer-executable code stored on a tangible computer readable medium for affecting software components of a data storage management system, including data storage management server software as part of the software components, the data storage management system comprising:

a server comprising a memory and a processor;

a console having a display for managing of a data storage environment; and computer-executable code configured for enabling the following steps:

initiating the installation of a database, which is a repository representative of a first software component of the data storage management system, wherein the repository includes tabular data entries; wherein the data storage management system comprises a plurality of software components and manages a data storage environment, the data storage environment comprising a plurality of computers and a data storage system, the data storage system comprising a plurality of storage devices; wherein each component of the data storage system to be installed has a set of questions to be answered by a user or the system;

deducing, for each question of the set of questions, whether the guest ion is determinable from the system without user input through the use of a sharability and params token; wherein the sharability token defines whether the answer to a question is usable between components and the params token contains a directive for an install utility to perform a system task;

supplementing the information deduced from the system by soliciting further installation information from user input;

using the user input to populate selected ones of the tabular data entries that are used to function in a state machine capacity to enforce rules and order of installation of further software components of the data storage management server software, without further user intervention, wherein the selected ones of said tabular data entries comprise answers to questions that are indicated to be sharable and shared between selected ones of said software components.

11. The system of claim 10, wherein data storage management server software for the data storage management system is installed following the installation of the repository and the order of installation is enforced by the state machine function.

12. The system of claim 11, wherein the tabular data entries are updated as other software components are installed in the data storage management system and these tabular data entries populated by the user are used to identify software components installed in the data storage management system.

13. The system of claim 12, wherein the data entries are shared with other users or during other installation operations.

14. The system of claim 11, wherein one or more other software components are installed following the installation of the server and the order of installation is enforced by the state machine function.

15. The system of claim 14, wherein server software for the data storage management system is installed following the installation of the repository and the order of installation is enforced by using the tabular data entries in the repository.

16. The system of claim 15, wherein the tabular data entries are updated as other software components are installed in the data storage management system and these tabular data entries are used to identify software components installed in the data storage management system.

17. The system of claim 16, wherein the data entries are shared with other users or during other installation operational.

18. The system of claim 17, wherein one or more other software components are installed following the installation of the server and the order of installation is enforced by the state machine function.

19. A computer program product for affecting software components of a data storage management system including a data storage management server and a data storage management console having a display for managing of a data storage environment, the computer program product comprising:

a tangible computer-readable storage medium including computer-executable code configured for enabling the following steps:

initiating the installation of a database, which is a repository representative of a first software component of the data storage management system, wherein the repository includes tabular data entries; wherein the data storage management system comprises a plurality of software components and manages a data storage environment, the data storage environment comprising a plurality of computers and a data storage system, the data storage system comprising a plurality of storage devices; wherein each component of the data storage system to be installed has a set of questions to be answered by a user or the system;

deducing, for each question of the set of questions, whether the guest ion is determinable from the system without user input through the use of a sharability and params token; wherein the sharability token defines whether the answer to a question is usable between components and the params token contains a directive for an install utility to perform a system task;

supplementing the information deduced from the system by soliciting further installation information from user input;

using the user input to populate selected ones of the tabular data entries that are used to function in a state machine capacity to enforce rules and order of installation of further software components of the data storage management server software, without further user intervention, wherein selected ones of said tabular data entries populated by the user comprise answers to questions that are indicated to be sharable and shared between selected ones of said software components.

20. The computer program product of claim 19, wherein data storage management server software for the data storage management system is installed following the installation of the repository and the order of installation is enforced by the state machine function.

21. The computer program product of claim 20, wherein the tabular data entries are updated as other software components are installed in the data storage management system and these tabular data entries are used to identify software components installed in the data storage management system.

22. The computer program product of claim 21, wherein the data entries are shared with other users or during other installation operations.

23. The computer program product of claim 20, wherein one or more other software components are installed following the installation of the server and the order of installation is enforced by the state machine function.

24. The computer program product of claim 23, wherein server software for the data storage management system is installed following the installation of the repository and the order of installation is enforced by using the tabular data entries in the repository.

25. The computer program product of claim 24, wherein the tabular data entries are updated as other software components are installed in the data storage management system and these tabular data entries are used to identify software components installed in the data storage management system.

26. The computer program product of claim 25, wherein the data entries are shared with other users or during other installation operational.

27. The computer program product of claim 24, wherein one or more other software components are installed following the installation of the server and the order of installation is enforced by the state machine function.

28. An apparatus for affecting software components of a data storage management system including a data storage management server and a data storage management console having a display for managing a data storage environment, the apparatus comprising:

a memory and a processor;

means for enforcing rules and order of installation of software components related to the data storage management system including state machine function means that are used to enforce rules and order of installation of further software components of the data storage management system without further user intervention, wherein each component of the data storage system to be installed has a set of questions to be answered by a user or the system, by deducing, for each question of the set of questions, whether the guest ion is determinable from the system without user input through the use of a sharability and params token; wherein the sharability token defines whether the answer to a question is usable between components and the params token contains a directive for an install utility to perform a system task; supplementing the information deduced from the system by soliciting further installation information from user input, once a database having the tabular data entry means, selected ones of which being populated by the user once a database having the tabular data entry means, selected ones of which being populated by the user, is installed in the data management storage system, wherein selected ones of said tabular data entries populated by the user comprise answers to questions that are indicated to be sharable and shared between selected ones of said software components, wherein the data storage management system comprises a plurality of software components and manages a data storage environment, the data storage environment comprising a plurality of computers and a data storage system, the data storage system comprising a plurality of storage devices.

* * * * *